United States Patent
Shikata et al.

(10) Patent No.: US 11,425,032 B2
(45) Date of Patent: Aug. 23, 2022

(54) SWITCHING DEVICE, COMMUNICATION CONTROL METHOD AND COMMUNICATION CONTROL PROGRAM

(71) Applicants: Sumitomo Electric Industries, Ltd., Osaka (JP); SUMITOMO WIRING SYSTEMS, LTD., Yokkaichi (JP); AUTONETWORKS TECHNOLOGIES, LTD., Yokkaichi (JP)

(72) Inventors: Hayato Shikata, Osaka (JP); Hirofumi Urayama, Osaka (JP); Hideki Maeda, Osaka (JP); Yasuhiro Yabuuchi, Yokkaichi (JP); Takeshi Hagihara, Yokkaichi (JP)

(73) Assignees: Sumitomo Electric Industries, Ltd., Osaka (JP); Sumitomo Wiring Systems, Ltd., Yokkaichi (JP); AutoNetworks Technologies, Ltd., Yokkaichi (JP)

( * ) Notice: Subject to any disclaimer, the term of this patent is extended or adjusted under 35 U.S.C. 154(b) by 292 days.

(21) Appl. No.: 16/496,212

(22) PCT Filed: Feb. 1, 2018

(86) PCT No.: PCT/JP2018/003374
§ 371 (c)(1),
(2) Date: Sep. 20, 2019

(87) PCT Pub. No.: WO2018/173501
PCT Pub. Date: Sep. 27, 2018

(65) Prior Publication Data
US 2020/0053003 A1 Feb. 13, 2020

(30) Foreign Application Priority Data
Mar. 23, 2017 (JP) .............................. JP2017-057357

(51) Int. Cl.
*H04L 45/28* (2022.01)
*H04L 12/46* (2006.01)
(Continued)

(52) U.S. Cl.
CPC .......... *H04L 45/28* (2013.01); *H04L 12/4666* (2013.01); *H04L 45/66* (2013.01);
(Continued)

(58) Field of Classification Search
CPC ..... H04L 45/28; H04L 12/4666; H04L 45/66; H04L 49/3009; H04L 49/604; H04L 12/4661; H04L 67/12
See application file for complete search history.

(56) References Cited

U.S. PATENT DOCUMENTS

| 2003/0043793 | A1* | 3/2003 | Reinold | ............... | H04L 45/566 |
| | | | | | 370/386 |
| 2008/0068985 | A1 | 3/2008 | Mieno | | |
| 2008/0310430 | A1* | 12/2008 | He | ........................ | H04L 41/12 |
| | | | | | 370/400 |
| 2011/0273980 | A1 | 11/2011 | Smith | | |

(Continued)

FOREIGN PATENT DOCUMENTS

| JP | 2005-518112 A | 6/2005 |
| JP | 2008-78893 A | 4/2008 |

(Continued)

*Primary Examiner* — Walter J Divito
*Assistant Examiner* — Anthony Luo
(74) *Attorney, Agent, or Firm* — Baker Botts L.L.P.; Michael A. Sartori

(57) ABSTRACT

A switching device relays data in an on-vehicle network and has a plurality of communication ports. The switching device comprises: a detection unit that detects a failure in communication with another switching device connected to one of the communication ports; and a processing unit that transmits failure information indicating at least any one of a site where the failure in communication occurs and a communication port to be used when the failure in communication occurs by a target switching device being a switching (Continued)

device different from said another switching device, to the target switching device if the failure in communication is detected by the detection unit.

15 Claims, 16 Drawing Sheets

(51) Int. Cl.
*H04L 45/00* (2022.01)
*H04L 49/00* (2022.01)
*H04L 49/60* (2022.01)
*H04L 67/12* (2022.01)

(52) U.S. Cl.
CPC ........ *H04L 49/3009* (2013.01); *H04L 49/604* (2013.01); *H04L 67/12* (2013.01)

(56) References Cited

U.S. PATENT DOCUMENTS

| | | | |
|---|---|---|---|
| 2012/0213060 A1* | 8/2012 | Poulson | H04L 45/22 370/225 |
| 2013/0294226 A1* | 11/2013 | Lim | H04L 12/4641 370/225 |
| 2014/0105001 A1 | 4/2014 | Smith | |
| 2014/0301403 A1 | 10/2014 | Yabe | |
| 2016/0366048 A1* | 12/2016 | Takezawa | H04L 43/0811 |
| 2018/0165245 A1* | 6/2018 | Ihara | H04L 45/22 |

FOREIGN PATENT DOCUMENTS

| | | |
|---|---|---|
| JP | 2012-119948 A | 6/2012 |
| JP | 2013-524557 A | 6/2013 |
| JP | 2015-88815 A | 5/2015 |
| JP | 2016-12932 A | 1/2016 |
| JP | 2017-55324 A | 3/2017 |
| WO | 03/021889 A1 | 3/2003 |
| WO | 2013061604 A1 | 5/2013 |

\* cited by examiner

FIG. 8

TabA

| DESTINATION MAC ADDRESS | OUTPUT DESTINATION | | | | |
|---|---|---|---|---|---|
| | NORMAL-TIME | FAILURE IN THE ROUTE CD | FAILURE IN THE ROUTE DA | FAILURE IN THE ROUTE AB | FAILURE IN THE ROUTE BC |
| MAC-SWD OR MAC-ECUD | COMMUNICATION PORT 54A | COMMUNICATION PORT 54A | COMMUNICATION PORT 54B | COMMUNICATION PORT 54A | COMMUNICATION PORT 54A |
| MAC-SWC OR MAC-ECUC | COMMUNICATION PORT 54A | COMMUNICATION PORT 54B | COMMUNICATION PORT 54B | COMMUNICATION PORT 54A | COMMUNICATION PORT 54A |
| MAC-SWB OR MAC-ECUB | COMMUNICATION PORT 54B | COMMUNICATION PORT 54B | COMMUNICATION PORT 54B | COMMUNICATION PORT 54A | COMMUNICATION PORT 54B |
| MAC-ECUA | COMMUNICATION PORT 54C | COMMUNICATION PORT 54C | COMMUNICATION PORT 54C | COMMUNICATION PORT 54C | COMMUNICATION PORT 54C |

FIG. 9

| DESTINATION MAC ADDRESS | OUTPUT DESTINATION | | | | |
|---|---|---|---|---|---|
| | NORMAL-TIME | FAILURE IN THE ROUTE DA | FAILURE IN THE ROUTE AB | FAILURE IN THE ROUTE BC | FAILURE IN THE ROUTE CD |
| MAC-SWA OR MAC-ECUA | COMMUNICATION PORT 54A | COMMUNICATION PORT 54A | COMMUNICATION PORT 54B | COMMUNICATION PORT 54A | COMMUNICATION PORT 54A |
| MAC-SWD OR MAC-ECUD | COMMUNICATION PORT 54A | COMMUNICATION PORT 54B | COMMUNICATION PORT 54B | COMMUNICATION PORT 54A | COMMUNICATION PORT 54A |
| MAC-SWC OR MAC-ECUC | COMMUNICATION PORT 54B | COMMUNICATION PORT 54B | COMMUNICATION PORT 54B | COMMUNICATION PORT 54A | COMMUNICATION PORT 54B |
| MAC-ECUB | COMMUNICATION PORT 54C | COMMUNICATION PORT 54C | COMMUNICATION PORT 54C | COMMUNICATION PORT 54C | COMMUNICATION PORT 54C |

TabB

FIG. 10

TabC

| DESTINATION MAC ADDRESS | OUTPUT DESTINATION | | | | |
|---|---|---|---|---|---|
| | NORMAL-TIME | FAILURE IN THE ROUTE AB | FAILURE IN THE ROUTE BC | FAILURE IN THE ROUTE CD | FAILURE IN THE ROUTE DA |
| MAC-SWB OR MAC-ECUB | COMMUNICATION PORT 54A | COMMUNICATION PORT 54A | COMMUNICATION PORT 54B | COMMUNICATION PORT 54A | COMMUNICATION PORT 54A |
| MAC-SWA OR MAC-ECUA | COMMUNICATION PORT 54B | COMMUNICATION PORT 54B | COMMUNICATION PORT 54A | COMMUNICATION PORT 54A | COMMUNICATION PORT 54A |
| MAC-SWD OR MAC-ECUD | COMMUNICATION PORT 54B | COMMUNICATION PORT 54B | COMMUNICATION PORT 54B | COMMUNICATION PORT 54A | COMMUNICATION PORT 54B |
| MAC-ECUC | COMMUNICATION PORT 54C | COMMUNICATION PORT 54C | COMMUNICATION PORT 54C | COMMUNICATION PORT 54C | COMMUNICATION PORT 54C |

FIG. 11

TabD

| DESTINATION MAC ADDRESS | OUTPUT DESTINATION | | | | |
|---|---|---|---|---|---|
| | NORMAL-TIME | FAILURE IN THE ROUTE BC | FAILURE IN THE ROUTE CD | FAILURE IN THE ROUTE DA | FAILURE IN THE ROUTE AB |
| MAC-SWC OR MAC-ECUC | COMMUNICATION PORT 54A | COMMUNICATION PORT 54A | COMMUNICATION PORT 54B | COMMUNICATION PORT 54A | COMMUNICATION PORT 54A |
| MAC-SWB OR MAC-ECUB | COMMUNICATION PORT 54B | COMMUNICATION PORT 54B | COMMUNICATION PORT 54B | COMMUNICATION PORT 54A | COMMUNICATION PORT 54B |
| MAC-SWA OR MAC-ECUA | COMMUNICATION PORT 54B | COMMUNICATION PORT 54B | COMMUNICATION PORT 54B | COMMUNICATION PORT 54A | COMMUNICATION PORT 54B |
| MAC-ECUD | COMMUNICATION PORT 54C | COMMUNICATION PORT 54C | COMMUNICATION PORT 54C | COMMUNICATION PORT 54C | COMMUNICATION PORT 54C |

SWITCHING DEVICE, COMMUNICATION CONTROL METHOD AND COMMUNICATION CONTROL PROGRAM

CROSS-REFERENCE TO RELATED APPLICATIONS

This application is the national phase under 35 U.S.C. § 371 of PCT International Application No. PCT/JP2018/003374 which has an International filing date of Feb. 1, 2018 and designated the United States of America.

FIELD

The present disclosure relates to a switching device, a communication control method and a communication control program.

BACKGROUND

Patent Document 1 (Japanese Patent Application Laid-Open No. 2016-12932) discloses a station side device as described below. The station side device includes active (in current use) OSUs 1 to N, a standby (spare) OSU N+1 and a control unit. The control unit conveys management information on ONUs linked to a logical line to and from a network management system (NMS). The logical line is defined by a fixed combination of an optical line unit and a passive optical network. Meanwhile, the OSUs acquire management information linked to a real line. The real line indicates an actual combination of the optical line unit and the passive optical network. The control unit converts a line linked to the management information between the logical line and the real line reciprocally by using mapping information.

SUMMARY (1) A switching device according to the present disclosure is a switching device relaying data in an on-vehicle network and having a plurality of communication ports and comprises a detection unit that detects a failure in communication with another switching device connected to one of the communication ports, and a processing unit that transmits failure information indicating at least any one of a site where the failure in communication occurs and a communication port to be used when the failure in communication occurs by a target switching device being a switching device different from this another switching device, to the target switching device if the failure in communication is detected by the detection unit.

(5) A switching device according to the present disclosure is a switching device relaying data in an on-vehicle network and having a plurality of communication ports and comprises a storage unit that stores usage port information indicating a correspondence among destination address information, the communication port to be used at a normal time and a failure-occurrence-time port being at least one of the communication ports to be used when a failure in communication occurs, and a processing unit that decides one of the communication ports of the switching device of itself to be used for transmission of the data based on the destination address information included in the data and the usage port information if the data including failure information indicating a failure in communication between other switching devices is received by the switching device of itself.

(10) A communication control method according to the present disclosure is a communication control method in a switching device relaying data in an on-vehicle network and having a plurality of communication ports, and comprises detecting a failure in communication with another switching device connected to one of the communication ports, and transmitting failure information indicating at least any one of a site where the failure in communication occurs and a communication port to be used when the failure in communication occurs by a target switching device being a switching device different from this another switching device, to the target switching device if the failure in communication is detected.

(11) A communication control method according to the present disclosure is a communication control method in a switching device relaying data in an on-vehicle network and having a plurality of communication ports and a storage unit, the storage unit storing usage port information indicating a correspondence among destination address information, the communication port to be used at a normal time and a failure-occurrence-time port being at least one of the communication ports to be used when a failure in communication occurs. The communication control method comprises receiving the data and deciding one of the communication ports of the switching device of itself to be used for transmission of the data based on the destination address information included in the data and the usage port information if the data including failure information indicating a failure in communication between other switching devices is received by the switching device of itself.

(12) A communication control program according to the present disclosure is a communication control program used in a switching device relaying data in an on-vehicle network and having a plurality of communication ports, and causes a computer to function as a detection unit that detects a failure in communication with another switching device connected to one of the communication ports, and a processing unit that transmits failure information indicating at least any one of a site where the failure in communication occurs and a communication port to be used when the failure in communication occurs by a target switching device being a switching device different from this another switching device, to the target switching device if the failure in communication is detected by the detection unit.

(13) A communication control program according to the present disclosure is a communication control program used in a switching device relaying data in an on-vehicle network and having a plurality of communication ports and a storage unit, the storage unit storing usage port information indicating a correspondence among destination address information, the communication port to be used at a normal time and a failure-occurrence-time port being at least one of the communication ports to be used when a failure in communication occurs. The communication control program causes a computer to function as a processing unit that decides one of the communication ports of the switching device of itself to be used for transmission of the data based on the destination address information included in the data and the usage port information if the data including failure information indicating a failure in communication between other switching devices is received by the switching device of itself.

One aspect of the present disclosure may be achieved as a switching device having such a characteristic processing unit as well as an on-vehicle communication system provided with the switching device. Moreover, one aspect of the present disclosure may be achieved as a semiconductor integrated circuit realizing a part or all of the switching device.

BRIEF DESCRIPTION OF THE DRAWINGS

FIG. 8 illustrates one example of an ARL table held by a storage unit in the switching device according to an embodiment of the present disclosure.

FIG. 9 illustrates one example of an ARL table held by the storage unit in the switching device according to an embodiment of the present disclosure.

FIG. 10 illustrates one example of an ARL table held by the storage unit in the switching device according to an embodiment of the present disclosure.

FIG. 11 illustrates one example of an ARL table held by the storage unit in the switching device according to an embodiment of the present disclosure.

DETAILED DESCRIPTION

Figure 1:
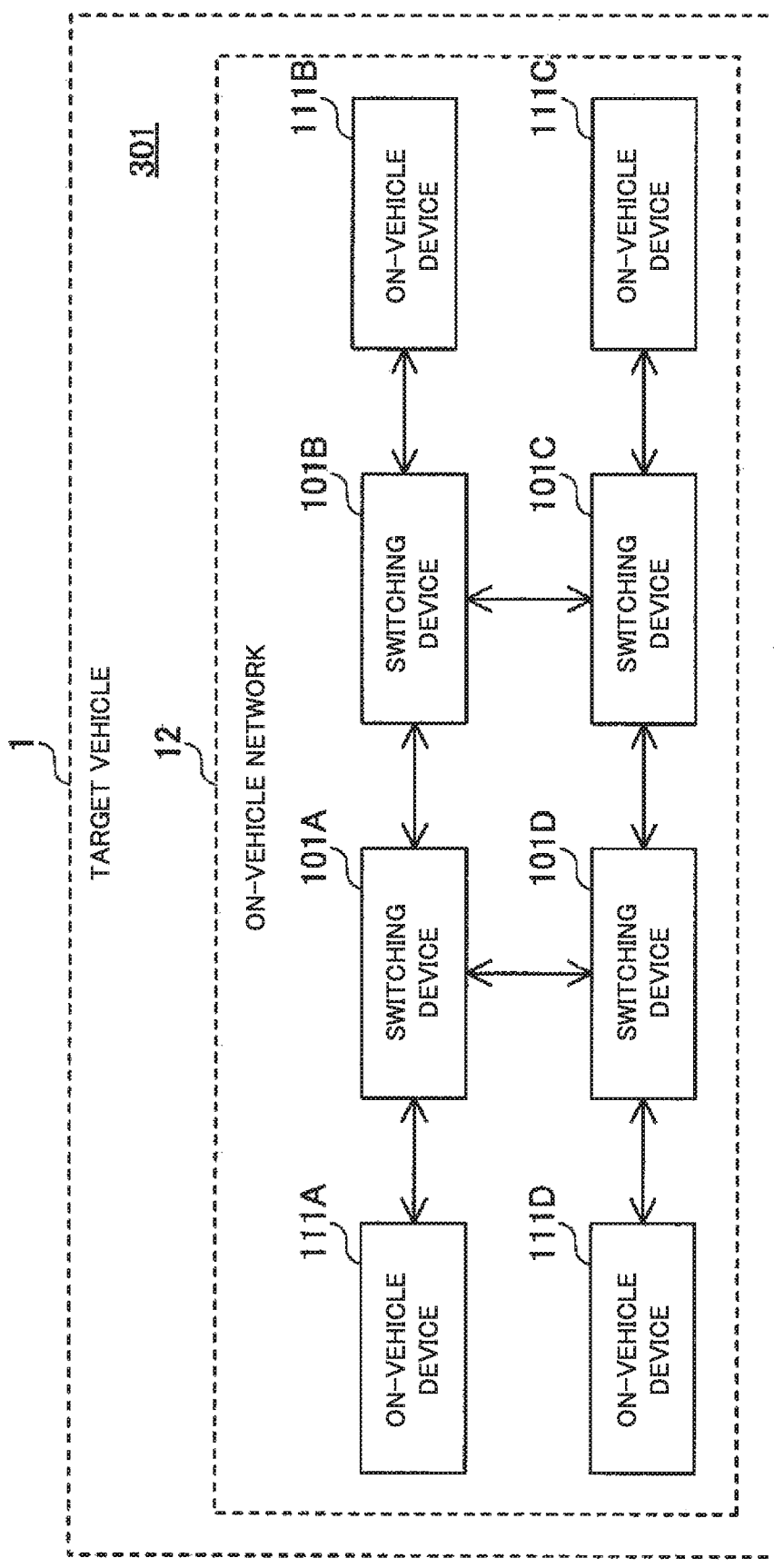
FIG. 1 illustrates the outline of the configuration of an on-vehicle communication system according to an embodiment of the present disclosure.

Conventionally, techniques for performing duplication (redundancy) of a system have been developed in order to offer a high quality service.

For example, applying the redundant configuration described in Patent Document 1 to an on-vehicle network is conceivable. Due to limitation of space in a vehicle, however, a noise source such as an engine, a motor and so on may be arranged close to signal lines. Such an arrangement may sharply deteriorate a communication environment depending on the operation of the noise source. Furthermore, the signal line may unexpectedly be disconnected.

In this case, communication may be made difficult, which is not preferable. Thus, a technique is required that is capable of performing redundant switching much faster in the on-vehicle network.

To solve the above-described problems, it is an object of the present disclosure to provide a switching device capable of performing redundant switching much faster in the on-vehicle network, a communication control method and a communication control program.

According to the present disclosure, it is possible to perform redundant switching much faster in the on-vehicle network.

(1) The switching device according to an embodiment of the present disclosure is a switching device relaying data in an on-vehicle network and having a plurality of communication ports and comprises a detection unit that detects a failure in communication with another switching device connected to one of the communication ports, and a processing unit that transmits failure information indicating at least any one of a site where the failure in communication occurs and a communication port to be used when the failure in communication occurs by a target switching device being a switching device different from this another switching device, to the target switching device if the failure in communication is detected by the detection unit.

Accordingly, failure information is transmitted to the target switching device when a failure in communication is detected, whereby the target switching device that receives the failure information can recognize that a communication failure occurs between the switching device from which the failure information is transmitted and another switching device based on the failure information, and can confirm the communication port to be used when the communication failure occurs based on the failure information. Thus, the communication route can be switched without sending and receiving information from and to the switching device from which the failure information is transmitted. Hence, redundant switching in the on-vehicle network can be made much faster.

(2) Preferably, the processing unit transmits to the target switching device the data to be transmitted to the target switching device, the data including the failure information.

This makes it possible to reduce the number of transmissions of information in comparison with a case where the data to be transmitted to the target switching device and the failure information are separately transmitted to the target switching device. Thus, redundant switching can be made much faster without reducing transmission efficiency in the on-vehicle network.

(3) Preferably, the processing unit transmits the data including the failure information in an area other than a checksum calculation targeted area in an IP packet.

This enables transmission of the failure information to the target switching device while recalculation of a checksum is avoided. Thus, redundant switching can be made much faster while preventing increase in processing load in the switching device.

(4) Preferably, the processing unit, when a first frame to be transmitted to the target switching device after detection of the failure in communication is transmitted together with the failure information included in the first frame, includes authentication information in the first frame.

This allows the target switching device to confirm that this frame is an authenticated frame based on the authentication information included in the received frame. Thus, redundant switching can be made much faster while ensuring security.

(5) The switching device according to an embodiment of the present disclosure is a switching device relaying data in an on-vehicle network and having a plurality of communication ports, and comprises a storage unit that stores usage port information indicating a correspondence among destination address information, the communication port to be used at a normal time and a failure-occurrence-time port being at least one of the communication ports to be used when a failure in communication occurs, and a processing unit that decides one of the communication ports of the switching device of itself to be used for transmission of the data based on the destination address information included in the data and the usage port information if the data including failure information indicating a failure in communication between other switching devices is received by the switching device of itself.

Accordingly, the communication port to which connection is switched is decided based on the destination address information and the usage port information, whereby the data can be quickly transmitted from the decided port. Thus, the communication route can be switched without sending and receiving information to and from the switching device from which the failure information is transmitted. Thus, redundant switching in the on-vehicle network can be made much faster.

(6) More preferably, the failure information includes a site where the failure in communication occurs, and the usage port information indicates the failure-occurrence-time port for each site where the failure in communication occurs.

This allows the switching device to confirm the site where a communication failure occurs based on the failure information even if the communication failure occurs in any communication route and to promptly acquire the failure-occurrence-time port from the usage port information based on the result of confirmation.

(7) Preferably, the processing unit transmits the data excluding the failure information if transmitting the data to a target device connected to one of the communication ports of the switching device of itself without interposing another switching device.

This allows the target device to receive data including no failure information regardless of the presence or absence of a communication failure. Thus, the target device can be connected to the on-vehicle network without involving a particular specification change.

(8) More preferably, the switching device further comprises a filter unit that discards non-target data satisfying a predetermined condition out of the data received by the switching device of itself, and the filter unit does not discard the non-target data including the failure information.

Accordingly, even if the communication route after redundant switching is a communication route not to be used in the situation where no communication failure occurs, for example, and the filter unit is set to discard the non-target data to be conveyed in this communication route, discard of the non-target data including the failure information can be prevented when a communication failure occurs. This makes it possible to prevent inability to perform redundant switching in the on-vehicle network due to the discard of the failure information.

(9) More preferably, the filter unit holds normal-time discard information indicative of data to be discarded including the non-target data and failure-occurrence-time discard information indicative of data not to be discarded including the non-target data, and the filter unit determines whether or not data is to be discarded using the failure-occurrence-time discard information in place of the normal-time discard information after the switching device of itself receives the non-target data including the failure information.

Hence, the normal-time discard information indicative of data to be discarded is switched to the failure-occurrence-time discard information indicative of data not to be discarded when a communication failure occurs, whereby discard of the non-target data including the failure information can easily be prevented.

(10) The communication control method according to an embodiment of the present disclosure is a communication control method in a switching device relaying data in an on-vehicle network and having a plurality of communication ports, and comprises detecting a failure in communication with another switching device connected to one of the communication ports, and transmitting failure information indicating at least one of a site where the failure in communication occurs and a communication port to be used when the failure in communication occurs by a target switching device being a switching device different from this another switching device, to the target switching device if the failure in communication is detected.

Accordingly, failure information is transmitted to a target switching device when a failure in communication is detected, whereby the target switching device that receives the failure information can recognize that a communication failure occurs between the switching device from which the failure information is transmitted and another switching device based on the failure information and can confirm the communication port to be used when the communication failure occurs based on the failure information. Thus, the communication route can be switched without sending and receiving information from and to the switching device from which the failure information is transmitted. Hence, redundant switching in the on-vehicle network can be made much faster.

(11) The communication control method according to an embodiment of the present disclosure is a communication control method in a switching device relaying data in an on-vehicle network and having a plurality of communication ports and a storage unit, the storage unit storing usage port information indicating a correspondence among destination address information, the communication port to be used at a normal time and a failure-occurrence-time port being at least one of the communication ports to be used when a failure in communication occurs. The communication control method comprises receiving the data and deciding one of the communication ports of the switching device of itself to be used for transmission of the data based on the destination address information included in the data and the usage port information if the data including failure information indicating a failure in communication between other switching devices is received by the switching device of itself.

Accordingly, the communication port to which connection is switched is decided based on the destination address information and the usage port information, whereby the data can be quickly transmitted from the decided port. Thus, the communication route can be switched without sending and receiving information to and from the switching device from which the failure information is transmitted. Thus, redundant switching in the on-vehicle network can be made much faster.

(12) The communication control program according to an embodiment of the present disclosure is a communication control program used in a switching device relaying data in an on-vehicle network and having a plurality of communication ports, and causes a computer to function as a detection unit that detects a failure in communication with another switching device connected to one of the communication ports, and a processing unit that transmits failure information indicating at least any one of a site where the failure in communication occurs and a communication port to be used when the failure in communication occurs by a target switching device being a switching device different from this another switching device, to the target switching device if the failure in communication is detected by the detection unit.

Accordingly, failure information is transmitted to the target switching device when a failure in communication is detected, whereby the target switching device that receives the failure information can recognize that a communication failure occurs between the switching device from which the failure information is transmitted and another switching device based on the failure information, and can confirm the communication port to be used when the communication failure occurs based on the failure information. Thus, the communication route can be switched without sending and receiving information from and to the switching device from which the failure information is transmitted. Hence, redundant switching in the on-vehicle network can be made much faster.

(13) The communication control program according to an embodiment of the present disclosure is a communication control program used in a switching device relaying data in an on-vehicle network and having a plurality of communication ports and a storage unit, the storage unit storing usage port information indicating a correspondence among destination address information, the communication port to be used at a normal time and a failure-occurrence-time port being at least one of the communication ports to be used when a failure in communication occurs. The communication control program causes a computer to function as a processing unit that decides one of the communication ports of the switching device of itself to be used for transmission of the data based on the destination address information included in the data and the usage port information if the data including failure information indicating a failure in communication between other switching devices is received by the switching device of itself.

Accordingly, the communication port to which connection is switched is decided based on the destination address information and the usage port information, whereby the data can be quickly transmitted from the decided port. Thus, the communication route can be switched without sending and receiving information to and from the switching device from which the failure information is transmitted. Thus, redundant switching in the on-vehicle network can be made much faster.

The embodiments of the present disclosure will be described below with reference to the drawings thereof. It is noted that the same or corresponding parts are denoted by the same reference codes in the drawings to avoid repetitive descriptions. Furthermore, at least parts of the embodiments described below may arbitrarily be combined.

[Configuration and Basic Operation]

FIG. 1 illustrates an outline of the configuration of an on-vehicle communication system according to an embodiment of the present disclosure.

Referring to FIG. 1, the on-vehicle communication system 301 includes switching devices 101A, 101B, 101C and 101D and on-vehicle devices 111A, 111B, 111C and 111D. The on-vehicle communication system 301 is mounted on a target vehicle 1.

Each of the switching devices 101A, 101B, 101C and 101D is also referred to as a switching device 101 below. Furthermore, each of the on-vehicle devices 111A, 111B, 111C and 111D is also referred to as an on-vehicle device 111.

Note that the target vehicle 1 may be mounted with three, or five or more switching devices 101, not limited to the four switching devices 101. The target vehicle 1 may be mounted with two, three, or five or more on-vehicle devices 111, not limited to the four on-vehicle devices 111.

The on-vehicle network 12 has a ring topology formed of the four switching devices 101 including the switching devices 101A-101D, for example. In the on-vehicle network 12, the switching devices 101A, 101B, 101C and 101D are respectively connected to the on-vehicle devices 111A, 111B, 111C and 111D, for example.

The switching device 101 and the on-vehicle device 111 as well as one switching device 101 and another switching device 101 are physically connected through Ethernet (registered trademark) cables, for example.

The on-vehicle device 111 includes, for example, a telematics communication unit (TCU), an automatic driving electronic control unit (ECU), a camera, a radar device, a navigation device or the like.

The TCU can communicate with a server or the like outside the target vehicle 1 by wirelessly communicating with a radio base station device in compliance with a communication standard such as long term evolution (LTE), 3G, or the like.

The automatic driving ECU controls automatic driving of a target vehicle 1. The camera photographs images or video around the target vehicle 1. The radar device is a millimeter wave radar, for example, and detects an object around the target vehicle 1. The navigation device receives map information from a map server outside the target vehicle 1 via the TCU and displays a map indicated by the received map information, for example.

IP packets are transmitted and received between the on-vehicle devices 111 in compliance with a communication protocol such as an IP/transmission control protocol (TCP) and an IP/user datagram protocol (UDP), for example.

Moreover, Ethernet frames each including an IP packet are transmitted and received between the switching device 101 and the on-vehicle device 111 as well as between one switching device 101 and another switching device 101 in compliance with an Ethernet communication protocol, for example.

More specifically, the switching device 101 relays IP packets to be transmitted and received between the on-vehicle devices 111.

The on-vehicle devices 111A-111D belong to the same subnet, for example. The switching device 101 functions as an L2 switch for IP packets to be transmitted and received between two on-vehicle devices 111, and relays the IP packets.

Note that a part of the on-vehicle devices 111A-111D may belong to a different subnet. In this case, the switching device 101 functions as an L3 switch for IP packets to be transmitted and received between the two on-vehicle devices 111 belonging to the different subnets, and relays the IP packets.

[Configuration of Ethernet Frame]

Figure 2:
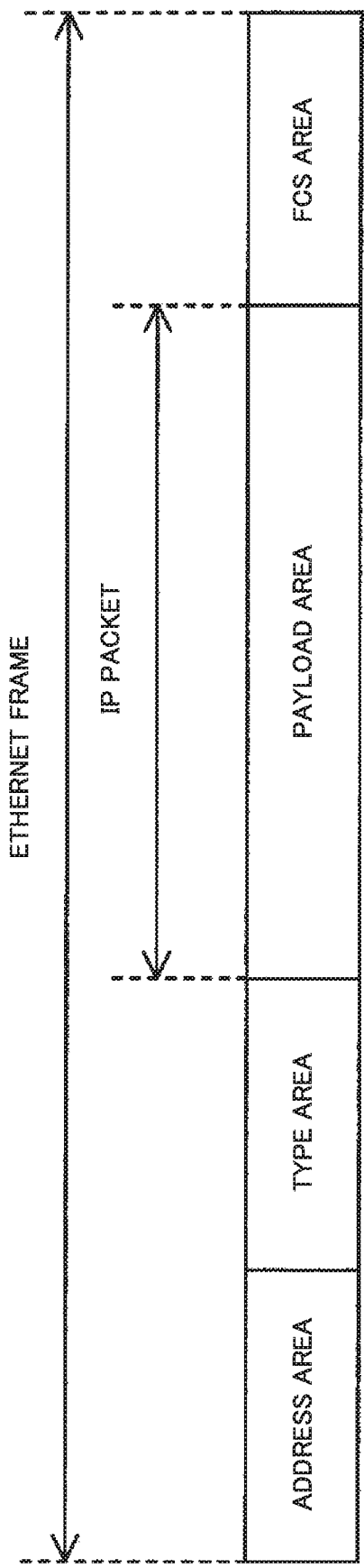
FIG. 2 illustrates one example of the configuration of an Ethernet frame to be transmitted and received in an on-vehicle network according to an embodiment of the present disclosure

FIG. 2 illustrates one example of the configuration of an Ethernet frame to be transmitted and received in the on-vehicle network according to an embodiment of the present disclosure.

Referring to FIG. 2, the Ethernet frame includes an address area, a type area, a payload area and a frame check sequence (FCS) area. The Ethernet frame illustrated in FIG. 2 is also referred to as a basic frame below.

The address area is for storing a destination media access control (MAC) address and a source MAC address.

The type area is for storing an ID indicating an upper layer protocol to be stored in the payload area, for example.

The FCS area is for storing a cyclic redundancy check (CRC) value based on the data stored in the address area, the type area and the payload area.

Figure 3:
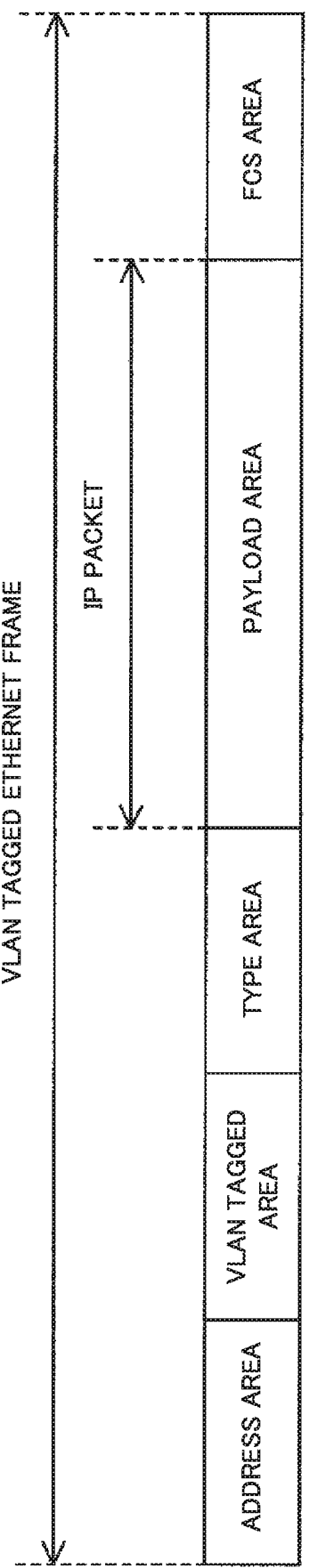
FIG. 3 illustrates one example of the configuration of a VLAN tagged Ethernet frame that is transmitted and received in the on-vehicle network according to an embodiment of the present disclosure.

FIG. 3 illustrates one example of the configuration of a VLAN tagged Ethernet frame to be transmitted and received in the on-vehicle network according to an embodiment of the present disclosure.

Referring to FIG. 3, the VLAN tagged Ethernet frame includes an address area, a virtual local area network (VLAN) tagged area, a type area, a payload area and an FCS area.

The VLAN tagged Ethernet frame illustrated in FIG. 3 is also simply referred to as a tagged frame below.

The data stored in the address area, the type area, the payload area and the FCS area in the tagged frame are respectively similar to the data stored in the address area, the type area and the payload area in the basic frame illustrated in FIG. 2.

The VLAN tagged area is for storing, for example, a type identifier, a VLAN ID and so on.

The FCS area is for storing a CRC value based on the data stored in the address area, the VLAN tagged area, the type area and the payload area.

In the header of the IP packet stored in the payload area, an IP checksum based on the data included in the payload of this IP packet, for example, is stored.

The IP header further includes a flag field and a fragment offset field. The details of the flag field and the fragment offset field will be described below.

[Flow Data]

Referring again to FIG. 1, the switching device 101 relays flow data in the on-vehicle network 12, for example.

More specifically, if one on-board device 111 transmits data of a large size to another on-vehicle device 111, for example, it fragments the data into multiple data. The flow data is composed of multiple IP packets each including the data fragmented by the on-vehicle device 111. The on-vehicle device 111 transmits the flow data to another on-vehicle device 111 via the switching device 101.

More specifically, in the flag field of the IP header, a flag indicating that one IP packet is, out of the IP packets constituting the flow data, still on the way (hereinafter, referred to as an in-progress flag).

If the in-progress flag is zero, this IP packet is the last one of the IP packets in the flow data (hereinafter also referred to as the last IP packet) or is an IP packet including no fragmented IP packet.

If the in-progress flag is one, this IP packet is an IP packet other than the last IP packet of the flow data, specifically, the first IP packet (hereinafter also referred to as the initial IP packet), the second IP packet and so on.

The fragment offset field includes a value indicating the position of the data stored in the IP packet of interest. For example, for the head IP packet, the value of the fragment offset field is zero.

Hence, if the in-progress flag is one and the value in the fragment offset field is zero, this IP packet is the initial IP packet. Meanwhile, if the in-progress flag is one and the value in the fragment offset field is a value other than zero, this IP packet is any one of the second and subsequent IP packets except for the last IP packet of the flow data (hereinafter also referred to as an intermediate IP packet). Alternatively, if the in-progress flag is zero and the value of the fragment offset field is a value other than zero, this IP packet is the last IP packet.

Figure 4:
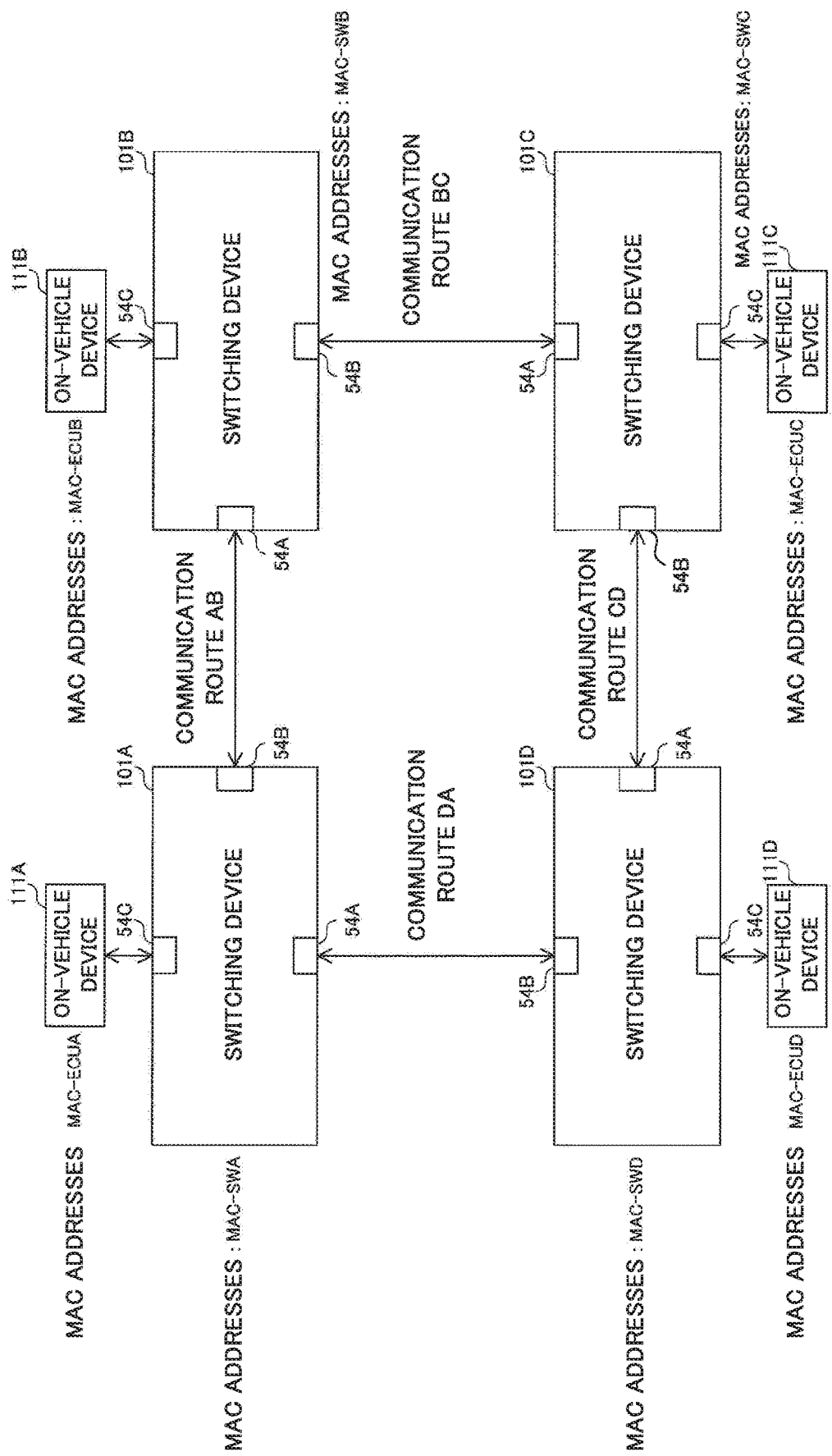
FIG. 4 illustrates the configuration of the on-vehicle communication system according to an embodiment of the present disclosure.

FIG. 4 illustrates the configuration of the on-vehicle communication system according to an embodiment of the present disclosure.

Referring to FIG. 4, the switching device 101 has communication ports 54A, 54B and 54C. Each of the communication ports 54A, 54B and 54C is also referred to as a communication port 54.

Note that the switching device 101 may be configured to have two, or four or more communication ports 54, not limited to have three communication ports 54.

The communication port 54 of the switching device 101 is a terminal, for example, capable of being connected to an Ethernet cable. Note that the communication port 54 may be a terminal of an integrated circuit.

The switching device 101A is connected to the switching device 101D, the switching device 101B and the on-vehicle device 111A via its own communication ports 54A, 54B and 54C, respectively.

The switching device 101B is connected to the switching device 101A, the switching device 101C and the on-vehicle device 111B via its own communication ports 54A, 54B and 54C, respectively.

The switching device 101C is connected to the switching device 101B, the switching device 101D and the on-vehicle device 111C via its own communication ports 54A, 54B and 54C, respectively.

The switching device 101D is connected to the switching device 101C, the switching device 101A and the on-vehicle device 111D via its own communication ports 54A, 54B and 54C, respectively.

The connection topology of the on-vehicle network 12 is fixed, that is, determined in advance. The communication route between the switching devices 101A and 101B, the communication route between the switching devices 101B and 101C, the communication route between the switching devices 101C and 101D, and the communication route between the switching devices 101D and 101A are defined as communication routes AB, BC, CD and DA, respectively.

Furthermore, the MAC addresses of the switching devices 101A, 101B, 101C and 101D are, for example, MAC-SWA, MAC-SWB, MAC-SWC and MAC-SWD, respectively. The MAC addresses of the on-vehicle devices 111A, 111B, 111C and 111D are, for example, MAC-ECUA, MAC-ECUB, MAC-ECUC and MAC-ECUD, respectively.

Problem

Figure 5:
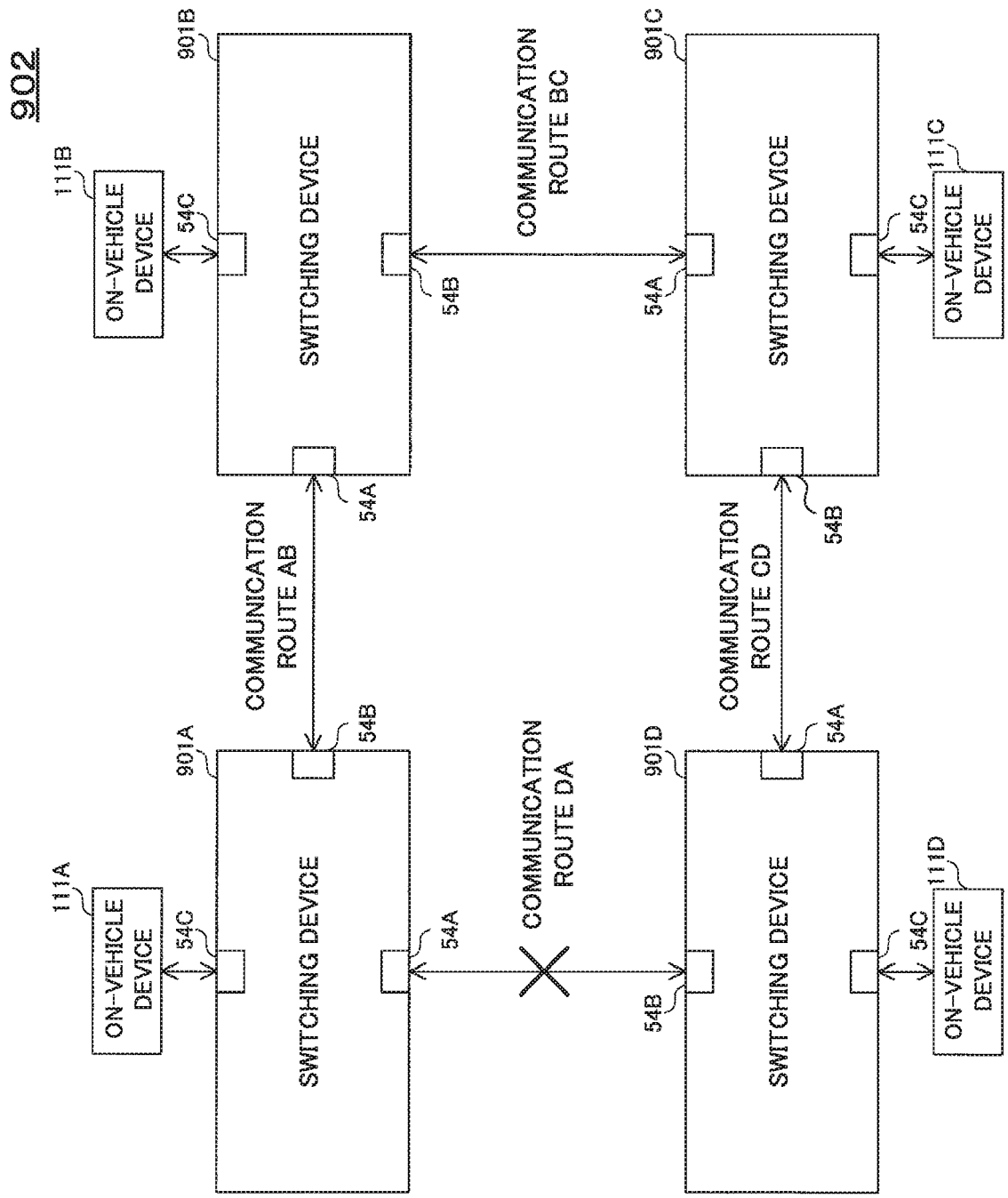
FIG. 5 illustrates the configuration of a comparative example of the on-vehicle communication system according to an embodiment of the present disclosure.

FIG. 5 illustrates the configuration of a comparative example of the on-vehicle communication system according to an embodiment of the present disclosure.

Referring to FIG. 5, an on-vehicle communication system 902, which is a comparative example of the on-vehicle communication system 301, includes switching devices 901A, 901B, 901C and 901D in place of the switching devices 101A, 101B, 101C and 101D unlike the on-vehicle communication system 301 illustrated in FIG. 1. Each of the switching devices 901A, 901B, 901C and 901D is also referred to as a switching device 901 below.

When detecting a failure in communication with another switching device 901, the switching device 901 switches one communication route to another communication route using a network management frame (bridge protocol data unit).

Specifically, the switching device 901 performs a handshake of exchanging a proposal and an agreement for each communication port 54 to thereby switch the communication route.

More specifically, when detecting a failure in communication with the switching device 901D, the switching device 901A transmits a proposal to the switching device 901B through its own communication port 54B.

Next, the switching device 901B, when receiving the proposal from the switching device 901A through its own communication port 54A, transmits an agreement to the switching device 901A through its own communication port 54A.

Then, the switching device 901B transmits a proposal to the switching device 901C through its own communication port 54B.

Subsequently, the switching device 901C, when receiving the proposal from the switching device 901B through its own communication port 54A, transmits an agreement to the switching device 901B through its own communication port 54A.

Next, the switching device 901C transmits a proposal to the switching device 901D through its own communication port 54B.

Then, the switching device 901D, when receiving the proposal from the switching device 901C through its own communication port 54A, transmits an agreement to the switching device 901C through its own communication port 54A.

After a communication route composed of the communication routes AB, BC and CD is thus established, data transfer from the switching device 901A to the switching device 901D is performed via the switching devices 901B and 901C.

The handshake operation between the two switching devices 901 is propagated one after another when the communication route is switched, so that it take a long time to switch the communication route. Thus, the time from when a communication failure is detected to when data transfer is restarted is increased, resulting in reduction of transmission efficiency in the on-vehicle network 12.

Hence, the on-vehicle communication system according to an embodiment of the present disclosure solves such problems using the following configuration and operation.

[Configuration of Switching Device 101]

Figure 6:
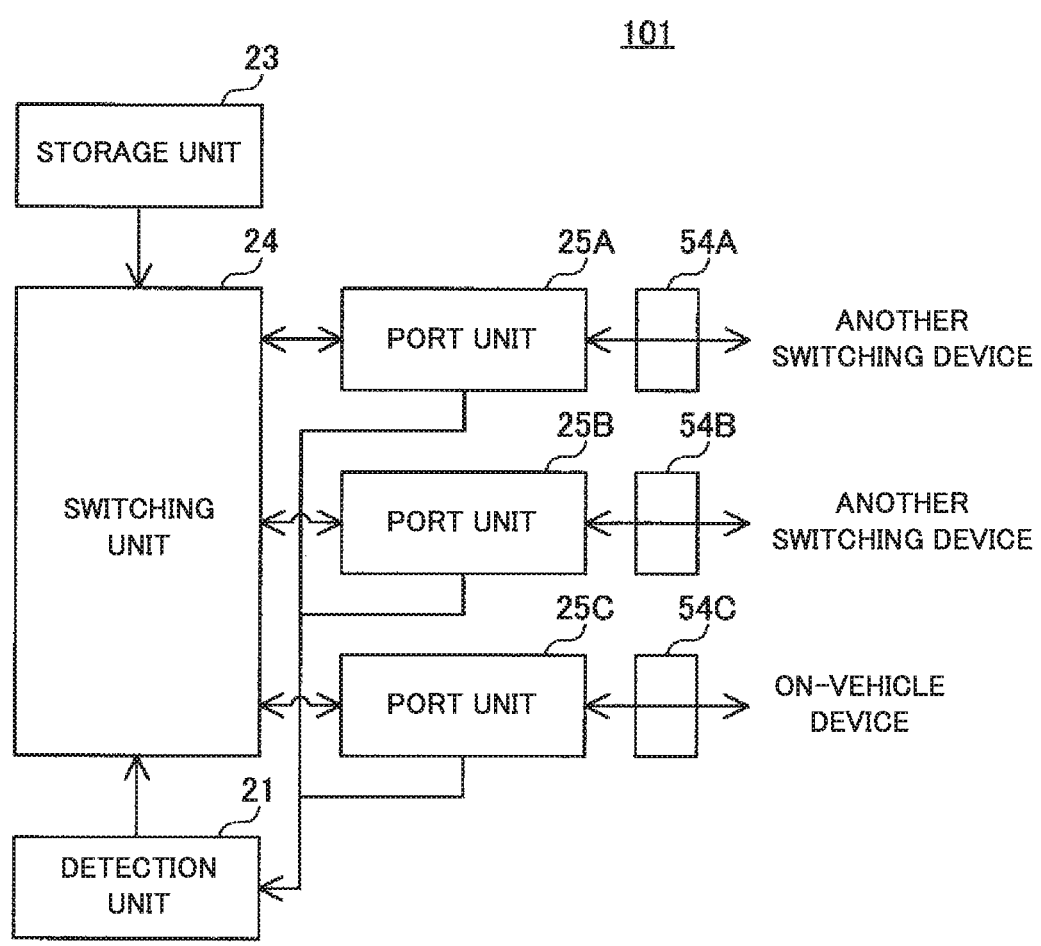
FIG. 6 illustrates the configuration of a switching device in the on-vehicle communication system according to an embodiment of the present disclosure.

FIG. 6 illustrates the configuration of a switching device in the on-vehicle communication system according to an embodiment of the present disclosure.

Referring to FIG. 6, the switching device 101 has a detection unit 21, a storage unit 23, a switching unit (processing unit) 24, port units 25A, 25B and 25C and communication ports 54A, 54B and 54C.

The port units 25A, 25B and 25C are provided to be correspond to the communication ports 54A, 54B and 54C. Each of the port units 25A, 25B and 25C is also referred to as a port unit 25.

The switching device 101 can be operated in a normal mode and in a detection mode, for example. The switching device 101 operates at the default in the normal mode, and is switched from the normal mode to the detection mode when detecting a communication failure.

Figure 7:
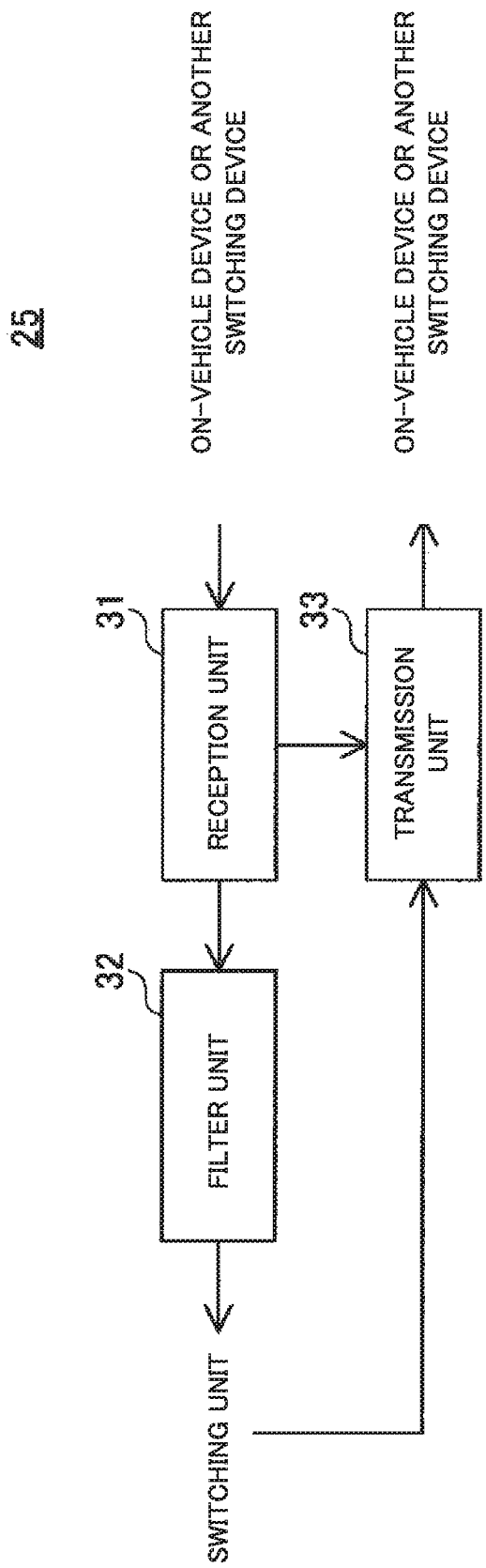
FIG. 7 illustrates the configuration of a port unit of the switching device according to an embodiment of the present disclosure.

FIG. 7 illustrates the configuration of a port unit in the switching device according to an embodiment of the present disclosure.

Referring to FIG. 7, the port unit 25 includes a reception unit 31, a filter unit 32 and a transmission unit 33.

Referring to FIG. 7, when receiving an Ethernet frame from the switching unit 24, the transmission unit 33 in the port unit 25 transmits the received Ethernet frame to the on-vehicle device 111 designated as a destination or another switching device 101 through the corresponding communication port 54.

The reception unit 31 has, for example, a buffer and, when receiving an Ethernet frame from the on-vehicle device 111 or another switching device 101 through the corresponding communication port 54, stores the received Ethernet frame in the buffer and outputs the stored Ethernet frame to the filter unit 32.

Moreover, if the transmission speed of the received data is higher than a predetermined limiting value, for example, the reception unit 31 transmits a request for reducing a transmission speed to the on-vehicle device 111 to be connected or another switching device 101 through the transmission unit 33 to thereby limit the transmission speed of the reception data.

The filter unit 32 discards, for example, non-target data that satisfies a predetermined condition out of the data received by its own switching device 101.

Specifically, when receiving an Ethernet frame from the reception unit 31, the filter unit 32 determines whether or not the received Ethernet frame is to be output to the switching unit 24 or to be discarded based on a predetermined condition.

More specifically, the filter unit 32 determines whether the Ethernet frame is to be output to the switching unit 24 or to be discarded according to an access control list (ACL) set by the user, for example.

For example, in the on-vehicle communication system 301, an Ethernet frame to be conveyed from the switching device 101B or the on-vehicle device 111B to the switching device 101C or the on-vehicle device 111C is decided to be conveyed through the communication route BC if no failure occurs in each of the communication routes (see FIG. 4).

Accordingly, the switching device 101A does not receive the above-mentioned Ethernet frame through its own communication port 54B if no failure occurs in each of the communication routes.

For the purpose of improvement in security, for example, the ACL in the switching device 101A includes a list element LA indicating that the above-mentioned Ethernet frame is to be discarded as an unauthenticated Ethernet frame if it is received through the communication port 54B.

Similarly, an Ethernet frame conveyed from the switching device 101A or the on-vehicle device 111A to the switching device 101D or the on-vehicle device 111D is decided to be conveyed through the communication route DA if no failure occurs in each of the communication routes.

Accordingly, each of the switching devices 101B, 101C and 101D does not receive the above-mentioned Ethernet frame through its own communication port 54A if no failure occurs in each of the communication routes.

The ACL in the switching device 101B includes a list element LB indicating that the above-mentioned Ethernet frame is to be discarded as an unauthenticated Ethernet frame if it is received through the communication port 54A, for the purpose of improvement in security, for example.

Similarly, the ACL in the switching device 101C includes a list element LC indicating that the above-mentioned Ethernet frame is to be discarded as an unauthenticated Ethernet frame if it is received through the communication port 54A, for the purpose of improvement in security, for example.

Likely, the ACL in the switching device 101D includes a list element LD indicating that the above-mentioned Ethernet frame is to be discarded as an unauthenticated Ethernet frame if it is received through the communication port 54A, for the purpose of improvement in security, for example.

Referring again to FIG. 6, the detection unit 21 detects a failure in communication with another switching device 101 connected to the communication port 54.

More specifically, the detection unit 21 monitors transmission and reception of signals and data at each of the port units 25A, 25B and 25C, reception quality of data, a status of the port unit 25, a status of another switching device 101 to be connected and so on.

The detection unit 21 determines that a communication failure occurs when detecting occurrence of a broken link with another switching device 101 to which the port part 25 is to be connected, degradation in communication quality with another switching device 101, a fault of the port unit 25, a fault of the switching device 101 to be connected or the like.

The detection unit 21 creates communication failure detection information indicative of the determined communication route and outputs the created communication failure detection information to the switching unit 24.

The switching unit 24 is an L2 switch and relays data, concretely, an IP packet in the on-vehicle network 12.

The following describes the operation of the switching devices 101A-101D in a situation where the switching device 101A receives from the on-vehicle device 111A an Ethernet frame to be conveyed from the on-vehicle device 111A to the on-vehicle device 111D in the case of an occurrence of a communication failure in the communication route DA.

[Operation of Switching Device 101A]

FIG. 8 illustrates one example of an ARL table held by the storage in the switching device according to an embodiment of the present disclosure.

Referring to FIG. 8, the storage unit 23 in the switching device 101A stores usage port information indicating a correspondence among destination address information, a communication port 54 to be used at a normal-time (hereinafter also referred to as a normal-time port) and four communication ports 54 to be used at an occurrence of a communication failure. Here, the usage port information indicates a failure-occurrence-time port for each site where a failure occurs, for example.

More specifically, the storage unit 23 stores an ARL table TabA, which is one example of the usage port information, indicating a correspondence between a destination MAC address and an output destination. Normal-time port is shown "under normal" for the output destination. Four communication failure-time ports for respective sites where failures occurs are shown under "failure in the route CD," "failure in the route DA," "failure in the route AB" and "failure in the route BC" for the output destination.

Referring again to FIG. 6, if any communication failure is detected by the detection unit 21, the switching unit 24 transmits failure information indicating the site where the communication failure occurs to a target switching device being a switching device 101 different from another switching device 101 for which a communication failure is detected, that is, the target switching device 101 being the switching device 101 connected to the communication port 54 different from the communication port 54 connected to this another switching device 101, i.e., the communication port 54 for which the communication failure occurs.

Specifically, when receiving communication failure detection information indicating that a communication failure occurs in the communication route DA from the detection unit 21, the switching unit 24 recognizes that a communication failure occurs in the communication route DA and switches the mode of its own switching device 101 from the normal mode to the detection mode.

The switching unit 24 then changes an item to be referred to in the ARL table TabA held in the storage unit 23 from "normal" to "failure in the route DA" for the output destination.

When receiving an Ethernet frame storing an IP packet to be conveyed from the on-vehicle device 111A to the on-vehicle device 111D from the port unit 25, the switching unit 24 confirms that the received Ethernet frame includes no failure information and performs first failure-occurrence-time processing.

More specifically, the switching unit 24 confirms a destination MAC address stored in the address area of the received Ethernet frame.

In this example, the switching unit 24 confirms MAC-ECUD being the MAC address of the on-vehicle device 111D. Here, the Ethernet frame transmitted from the on-vehicle device 111A is a basic frame having the format illustrated in FIG. 2, for example.

The switching unit 24 refers to the ARL table TabA held in the storage unit 23 and acquires the "communication port 54B" corresponding to MAC-ECUD under "failure in the route DA" from the ARL table TabA.

The switching unit 24 holds connection destination information indicating a destination device to which each of the communication ports 54 is to be connected, for example, and confirms that the destination to which the "communication port 54B" is to be connected is the switching device 101B based on the connection destination information.

Furthermore, the switching unit 24 includes failure information in data to be transmitted to a target switching device, for example, and includes the failure information in an area other than the checksum calculation targeted area in the IP packet.

More specifically, the switching unit 24 adds a VLAN tagged area (see FIG. 3), which is one example of an area other than the checksum calculation targeted area in the IP packet, to the basic frame received from the port unit 25, for example, to thereby convert the basic frame to a tagged frame.

The switching unit 24 then creates failure information indicative of the communication route DA and stores the created failure information in the VLAN tagged area.

Note that the switching unit 24 may be configured to store the failure information in the type area, which is one example of an area other than the checksum calculation targeted area in the IP packet, not limited to store the failure information in the VLAN tagged area. The type area, however, is highly likely to have already been reserved and thus the failure information may preferably be stored in the VLAN tagged area.

Furthermore, when transmitting the first Ethernet frame to be transmitted to the target switching device after detection of a communication failure in such a manner that the failure information is included, the switching unit 24 includes authentication information in this frame.

More specifically, the switching unit 24 changes an item to be referred to in the ARL table TabA from the item "normal" to "failure in the route DA" and then performs the following processing on the first tagged frame to be transmitted to the target switching device (hereinafter also referred to as a post detection initial frame).

That is, the switching unit 24 creates a time stamp indicative of a reception time, which is one example of the authentication information, for example, and stores the created time stamp in the payload of the IP packet of the post detection initial frame.

The switching unit 24 recalculates a checksum in the IP packet and stores the calculation result in the header of the IP packet.

Moreover, after transmitting the post detection initial frame, the switching unit 24 does not include the time stamp in the tagged frame for the second and subsequent tagged frames to be transmitted to the target switching device (hereinafter also referred to as a post detection non-initial frame).

By such a configuration, in the post detection non-initial frame, recalculation of a checksum in the IP packet can be avoided, so that increase in processing load in the switching device 101A can be prevented.

The switching unit 24 rewrites the source MAC address stored in the address area of the tagged frame into the MAC address of its own switching device 101A, i.e., MAC-SWA and outputs this tagged frame to the port unit 25B corresponding to the acquired output destination, i.e., the "communication port 54B."

When receiving the tagged frame from the switching unit 24, the port unit 25B transmits the received tagged frame to the target switching device, i.e., the switching device 101B.

In the normal mode unlike the detection mode, when receiving an Ethernet frame including no failure information from the port unit 25, for example, the switching unit 24 confirms the destination MAC address stored in the address area of the received Ethernet frame.

Referring to the ARL table TabA held in the storage unit 23, the switching unit 24 acquires the output destination corresponding to the confirmed destination MAC address under "normal" from the ARL table TabA.

The switching unit 24 then rewrites the source MAC address stored in the address area of this Ethernet frame into MAC-SWA and then outputs the Ethernet frame to the port unit 25 corresponding to the acquired communication port 54 of an output destination.

[Operation of Switching Device 101B]

Referring again to FIG. 7, for the port unit 25A of the switching device 101B, when receiving the tagged frame from the switching device 101A, the reception unit 31 outputs the received tagged frame to the filter unit 32.

The filter unit 32 does not discard non-target data including the failure information, for example. Specifically, the filter unit 32 does not discard the non-target data regardless of the contents of the ACL, for example.

More specifically, the filter unit 32 discards an Ethernet frame to be conveyed from the on-vehicle device 111A to the on-vehicle device 111D that includes no failure information according to the above-mentioned list element LB whereas the filter unit 32 outputs a tagged frame that includes failure information to the switching unit 24 without discarding it even if the frame is an Ethernet frame to be conveyed from the on-vehicle device 111A to the on-vehicle device 111D.

Concretely, when receiving the tagged frame from the reception unit 31, the filter unit 32 temporarily determines that the tagged frame is to be discarded based on the destination MAC address and the source MAC address that are stored in the address area of the received tagged frame and the above-mentioned list element LB.

The filter unit 32 determines that the tagged frame is not to be discarded when confirming that the failure information is stored in the VLAN tagged area of the tagged frame and outputs the tagged frame to the switching unit 24.

Note that the filter unit 32 may be configured to determine whether or not non-target data is to be discarded depending on the contents of the ACL, though the filter unit 32 is not limited to be configured not to discard the non-target data irrespective of the contents of the ACL.

Specifically, the filter unit 32 holds normal-time discard information indicative of data to be discarded including non-target data and failure-occurrence-time discard information indicative of data not to be discarded including non-target data. The filter unit 32 determines whether or not data is to be discarded using the failure-occurrence-time discard information in place of the normal-time discard information after the switching device 101 of its own receives non-target data including failure information.

More specifically, the filter unit 32 holds, for example, an ACL for normal-time including the above-described list element LB, which is one example of the normal-time discard information, and an ACL for failure-occurrence-time, which is one example of the failure-occurrence-time discard information. The ACL for failure-occurrence-time includes a list element LB2 indicating that the Ethernet frame conveyed from the switching device 101A or the on-vehicle device 111A to the switching device 101D or the on-vehicle device 111D is to be processed as a normal Ethernet frame if it is received from the communication port 54A, for example.

The filter unit 32 determines whether the Ethernet frame received from the reception unit 31 is to be output to the switching unit 24 or to be discarded according to the ACL for normal-time until it receives the Ethernet frame from the reception unit 31 and confirms that the failure information is included in the VLAN tagged area of the received Ethernet frame.

Specifically, if receiving the Ethernet frame to be conveyed from the on-vehicle device 111A to the on-vehicle device 111D from the reception unit 31, the filter unit 32 discards this Ethernet frame according to the above-mentioned list element LB.

The filter unit 32 determines whether the Ethernet frame received from the reception unit 31 is to be output to the switching unit 24 or to be discarded according to the ACL for failure-occurrence-time when confirming that the failure information is stored in the VLAN tagged area of the Ethernet frame received from the reception unit 31.

Specifically, if receiving from the reception unit 31 the Ethernet frame to be conveyed from the on-vehicle device 111A to the on-vehicle device 111D, the filter unit 32 outputs this Ethernet frame to the switching unit 24 according to the above-mentioned list element LB2 without discarding it.

FIG. 9 illustrates one example of an ARL table held by the storage unit in the switching device according to an embodiment of the present disclosure.

Referring to FIG. 9, the storage unit 23 in the switching device 101B stores an ARL table TabB, which is one example of usage port information. The way of viewing the ARL table TabB is similar to that of the ARL table TabA illustrated in FIG. 8.

Referring again to FIG. 6, the switching unit 24, if its own switching device 101B receives data including the failure information indicative of the site where the communication failure occurs between other switching devices 101, decides the communication port 54 of its own switching device 101B to be used for transmitting this data based on the destination address information included in the data and the usage port information.

Specifically, when receiving the tagged frame from the port unit 25 and confirming that the failure information is stored in the VLAN tagged area of the received tagged frame, the switching unit 24 performs second failure-occurrence-time processing.

More specifically, after confirming that the failure information is stored in the VLAN tagged area, the switching unit 24 performs the following processing on the first tagged frame, i.e., the post detection initial frame.

That is, the switching unit 24 tries to authenticate the post detection initial frame based on the time stamp stored in the payload area of the IP packet in the post detection initial frame, for example. Here, the switching unit 24 succeeds in authenticating the post detection initial frame.

If, on the contrary, failing in authenticating the post detection initial frame, for example, the switching unit 24 discards the post detection initial frame. Furthermore, the switching unit 24 does not authenticate the post detection non-initial frame.

The switching unit 24 recognizes that a communication failure occurs in the communication route DA based on the failure information in the tagged frame and changes an item to be referred to in the ARL table TabB held in the storage unit 23 from "normal" to "failure in the route DA" for the output destination.

The switching unit 24 confirms the destination MAC address stored in the address area of the tagged frame, i.e., MAC-ECUD.

Referring to the ARL table TabB held in the storage unit 23, the switching unit 24 acquires the "communication port 54B" corresponding to MAC-ECUD under "failure in the route DA" from the ARL table TabB.

The switching unit 24 holds connection destination information indicating a destination device to which each of the communication ports 54 is to be connected, for example, and recognizes that the destination to which the "communication port 54B" is to be connected is the switching device 101C based on the connection destination information.

The switching unit 24 rewrites the source MAC address stored in the address area of the tagged frame into MAC-SWB and then outputs this tagged frame to the port unit 25B corresponding to the acquired output destination, i.e., the "communication port 54B."

When receiving the tagged frame from the switching unit 24, the port unit 25B transmits the received tagged frame to the switching device 101C.

[Operation of Switching Device 101C]

The switching device 101C is similar in operation to the switching device 101B, and thus the description thereof will simply be made.

Referring again to FIG. 7, for the port unit 25A of the switching device 101C, the filter unit 32 performs the following processing when receiving the tagged frame from the switching device 101B via the reception unit 31.

That is, the filter unit 32 determines that the tagged frame is not to be discarded based on the destination MAC address and the source MAC address that are stored in the address area, the above-mentioned list element LC and the failure information stored in the VLAN tagged area, and outputs the tagged frame to the switching unit 24.

FIG. 10 illustrates one example of an ARL table held by the storage unit in the switching device according to an embodiment of the present disclosure.

Referring to FIG. 10, the storage unit 23 in the switching device 101C stores an ARL table TabC, which is one example of usage port information. The way of viewing the ARL table TabC is similar to that of the ARL table TabA illustrated in FIG. 8.

Referring again to FIG. 6, the switching unit 24 performs the second failure-occurrence-time processing when receiving the tagged frame from the port unit 25 and confirming that the failure information is stored in the VLAN tagged area of the received tagged frame.

More specifically, after confirming that the failure information is stored in the VLAN tagged area, the switching unit 24 performs the following processing on the first tagged frame, i.e., the post detection initial frame.

That is, the switching unit 24 tries to authenticate the post detection initial frame based on the time stamp stored in the payload area of the IP packet in the post detection initial frame, for example. Here, the switching unit 24 succeeds in authenticating the post detection initial frame.

The switching unit 24 recognizes that a communication failure occurs in the communication route DA based on the failure information stored in the VLAN tagged area of the received tagged frame and changes an item to be referred to in the ARL table TabC from "normal" to "failure in the route DA" for the output destination.

The switching unit 24 confirms the destination MAC address stored in the address area of the tagged frame, i.e., MAC-ECUD and acquires the "communication port 54B" corresponding to MAC-ECUD under "failure in the route DA" from the ARL table TabC.

The switching unit 24 holds connection destination information indicating a destination device to which each of the communication ports 54 is to be connected, for example, and recognizes that the destination to which the "communication port 54B" is to be connected is the switching device 101D based on the connection destination information.

The switching unit 24 rewrites the source MAC address stored in the address area of the tagged frame into MAC-SWC and then outputs this tagged frame to the port unit 25B corresponding to the acquired output destination, i.e., the "communication port 54B".

When receiving the tagged frame from the switching unit 24, the port unit 25B transmits the received tagged frame to the switching device 101D.

[Operation of Switching Device 101D]

Referring again to FIG. 7, for the port unit 25A of the switching device 101D, the filter unit 32 performs the following processing when receiving the tagged frame from the switching device 101C via the reception unit 31.

That is, the filter unit 32 determines that the tagged frame is not to be discarded based on the destination MAC address and the source MAC address that are stored in the address area, the above-mentioned list element LD and the failure information stored in the VLAN tagged area, and outputs the tagged frame to the switching unit 24.

FIG. 11 illustrates one example of an ARL table held by the storage unit in the switching device according to an embodiment of the present disclosure.

Referring to FIG. 11, the storage unit 23 in the switching device 101D stores an ARL table TabD, which is one example of usage port information. The way of viewing the ARL table TabD is similar to that of the ARL table TabA illustrated in FIG. 8.

Referring again to FIG. 6, if transmitting data to the target device connected to the communication port 54 of its own switching device 101D without interposing another switching device 101, for example, the switching unit 24 transmits the data from which the failure information is excluded, for example.

Specifically, the switching unit 24 performs the second failure-occurrence-time processing when receiving the tagged frame from the port unit 25 and confirming that the failure information is stored in the VLAN tagged area of the received tagged frame.

More specifically, the switching unit 24 performs the following processing on the first tagged frame, i.e., the post detection initial frame after confirming that the failure information is stored in the VLAN tagged area.

That is, the switching unit 24 tries to authenticate the post detection initial frame based on the time stamp stored in the payload area of the IP packet in the post detection initial frame, for example. Here, the switching unit 24 succeeds in authenticating the post detection initial frame.

The switching unit 24 recognizes that a communication failure occurs in the communication route DA based on the failure information stored in the VLAN tagged area of the received tagged frame and changes an item to be referred to in the ARL table TabD from "normal" to "failure in the route DA" for the output destination.

The switching unit 24 then confirms the destination MAC address stored in the address area of the tagged frame, i.e., MAC-ECUD and acquires the "communication port 54C" corresponding to MAC-ECUD under "failure in the route DA" from the ARL table TabD.

The switching unit 24 holds connection destination information indicating a destination device to which each of the communication ports 54 is to be connected, for example, and recognizes that the destination to which the "communication port 54C" is to be connected is the on-vehicle device 111D based on the connection destination information.

The switching unit 24 deletes the VLAN tagged area in the tagged frame and converts the tagged frame into a basic frame since the destination to which the "communication port 54C" is to be connected is the on-vehicle device 111D, not the other switching devices 101.

Furthermore, the switching unit 24 deletes the time stamp from the payload of the IP packet in the basic frame. The switching unit 24 then recalculates a checksum in the IP packet and stores the calculation result in the header of the IP packet.

The switching unit 24 rewrites the source MAC address stored in the address area of the basic frame into MAC-SWD and then outputs this basic frame to the port unit 25C corresponding to the acquired output destination, i.e., the "communication port 54C."

When receiving the basic frame from the switching unit 24, the port unit 25C transmits the received basic frame to the target device, i.e., the on-vehicle device 111D.

[Flow of Operation]

Each of the devices in the on-vehicle communication system 301 includes a computer, and a computation processing unit such as a CPU in the computer reads out programs including a part or all of the steps in a sequence diagram or a flowchart as described below from a memory not illustrated and executes the same. These programs of the multiple devices may be installed from the external device. These programs of the multiple devices may be distributed while being stored in a recording medium.

Figure 12:
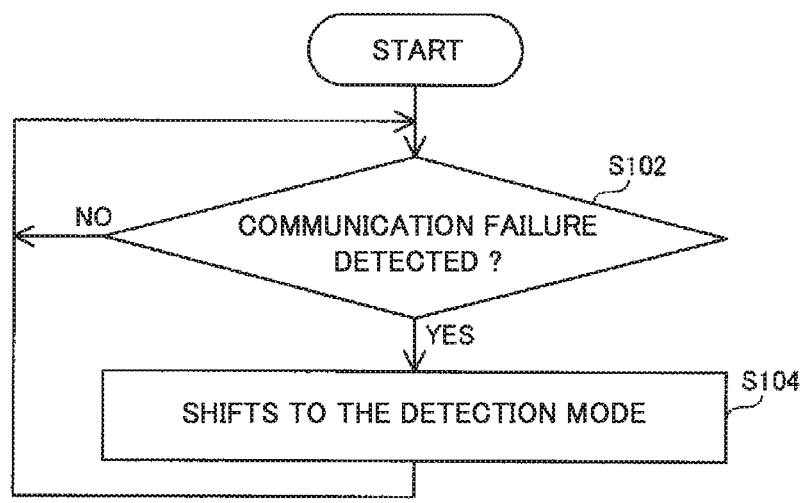
FIG. 12 is a flowchart of an operational procedure when the switching device in the on-vehicle communication system according to an embodiment of the present disclosure detects a communication failure.

FIG. 12 is a flowchart of an operational procedure when the switching device in the on-vehicle communication system according to an embodiment of the present disclosure detects a communication failure.

Referring to FIG. 12, it is assumed that the switching device 101 is in the normal mode.

First, the switching device 101 continues to monitor the port unit 25 until it detects a failure in communication with another switching device 101 to which its own port unit 25 is to be connected (NO at step S102), and shifts to the detection mode (step S104) when a communication failure is detected (YES at step S102).

Figure 13:
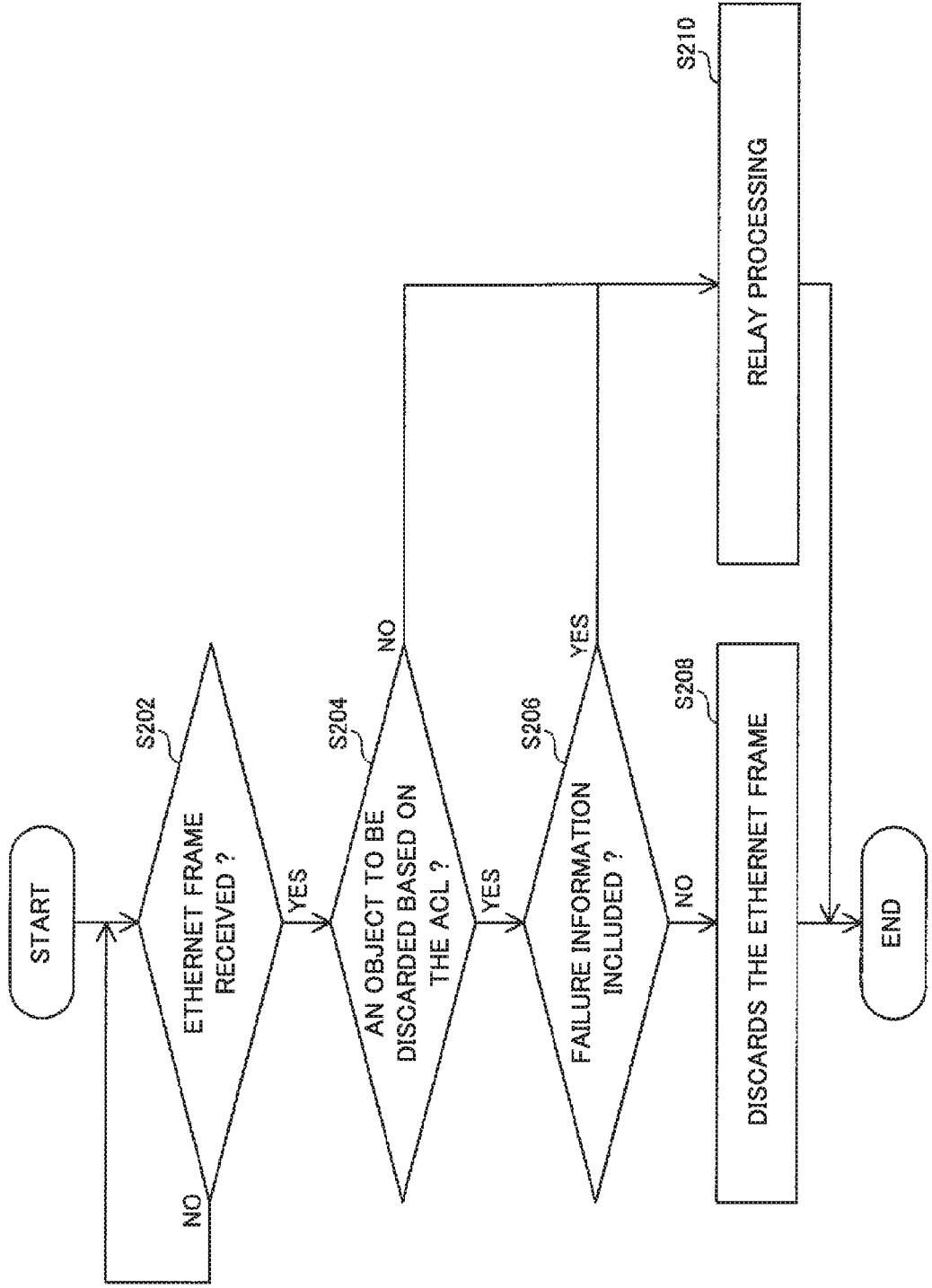
FIG. 13 is a flowchart of an operational procedure performed when the switching device in the on-vehicle communication system according to an embodiment of the present disclosure receives an Ethernet frame.

FIG. 13 is a flowchart of an operational procedure performed when the switching device in the on-vehicle communication system according to an embodiment of the present disclosure receives an Ethernet frame.

Referring to FIG. 13, the switching device 101 is first held stand-by (NO at step S202) until it receives an Ethernet frame from the on-vehicle device 111 or another switching device 101.

When receiving an Ethernet frame from the on-vehicle device 111 or another switching device 101 (YES at step S202), the switching device 101 discards the Ethernet frame (step S208) if the received Ethernet frame is an object to be discarded based on the ACL and includes no failure information (YES at step S204 and NO at step S206).

If, on the contrary, the received Ethernet frame is not an object to be discarded based on the ACL (NO at step S204), or if it is an object to be discarded based on the ACL but includes failure information (YES at step S204 and YES at step S206), the switching device 101 performs relay processing of the received Ethernet frame (step S210).

Figure 14:
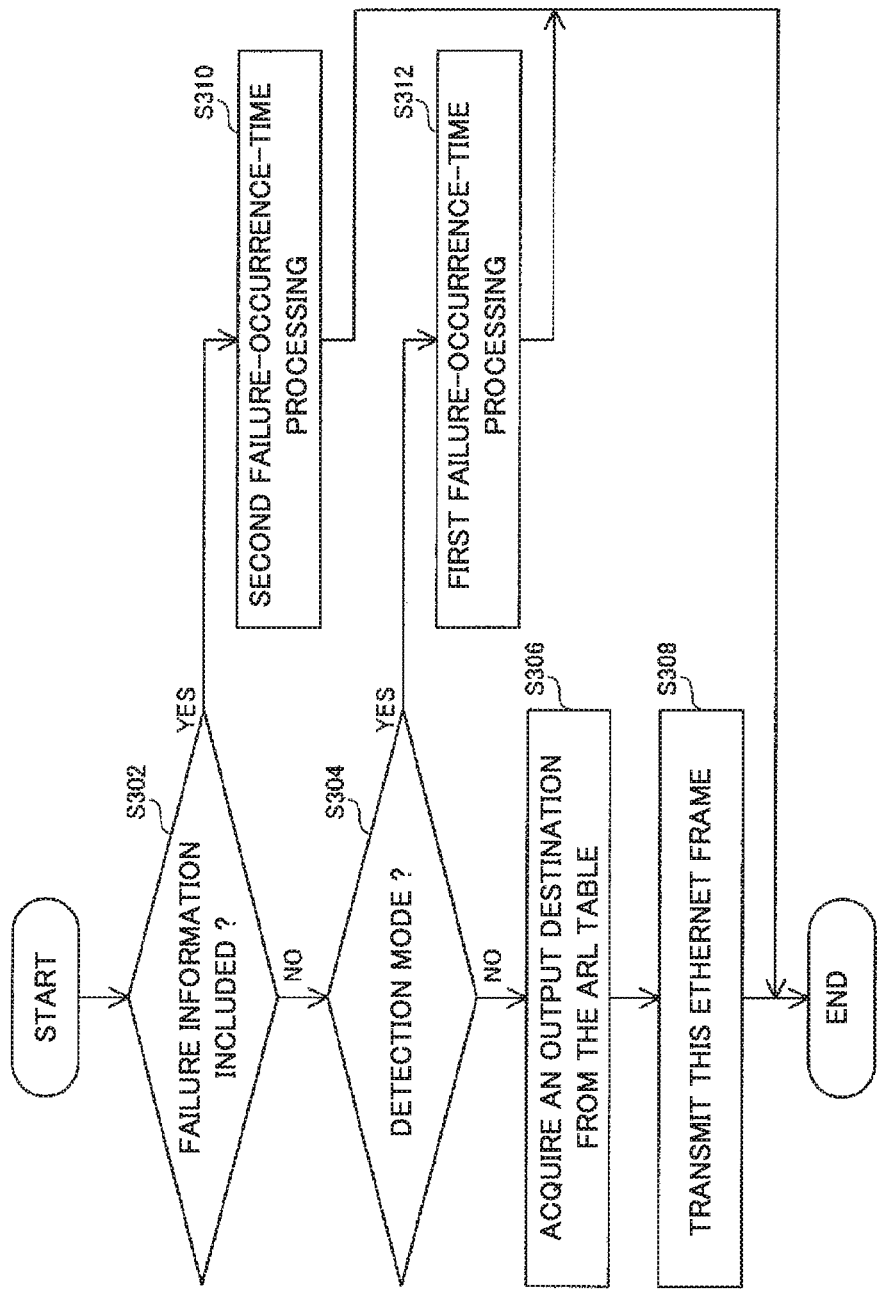
FIG. 14 is a flowchart of an operational procedure performed when the switching device in the on-vehicle communication system according to an embodiment of the present disclosure performs relay processing of an Ethernet frame.

FIG. 14 is a flowchart of an operational procedure performed when the switching device in the on-vehicle communication system according to an embodiment of the present disclosure performs relay processing of an Ethernet frame. FIG. 14 illustrates the details of the operation at step S210 in FIG. 13.

Referring to FIG. 14, if the received Ethernet frame does not include failure information and the switching device 101 is in the normal mode (NO at step S302 and NO at step S304), the switching device 101 first performs the following processing.

That is, the switching device 101 confirms the destination MAC address in the received Ethernet frame and acquires an output destination corresponding to the confirmed destination MAC address under "at a normal time" from the ARL table stored in the storage unit 23 of its own (step S306).

Next, the switching device 101 rewrites the source MAC address in the received Ethernet frame into the MAC address of its own and then transmits this Ethernet frame from the acquired output destination (step S308).

In contrast, if the received Ethernet frame includes failure information (YES at step S302), the switching device 101 performs the second failure-occurrence-time processing (step S310).

Meanwhile, if being in the detection mode (NO at step S302 and YES at step S304), the switching device 101 performs the first failure-occurrence-time processing (step S312).

Figure 15:
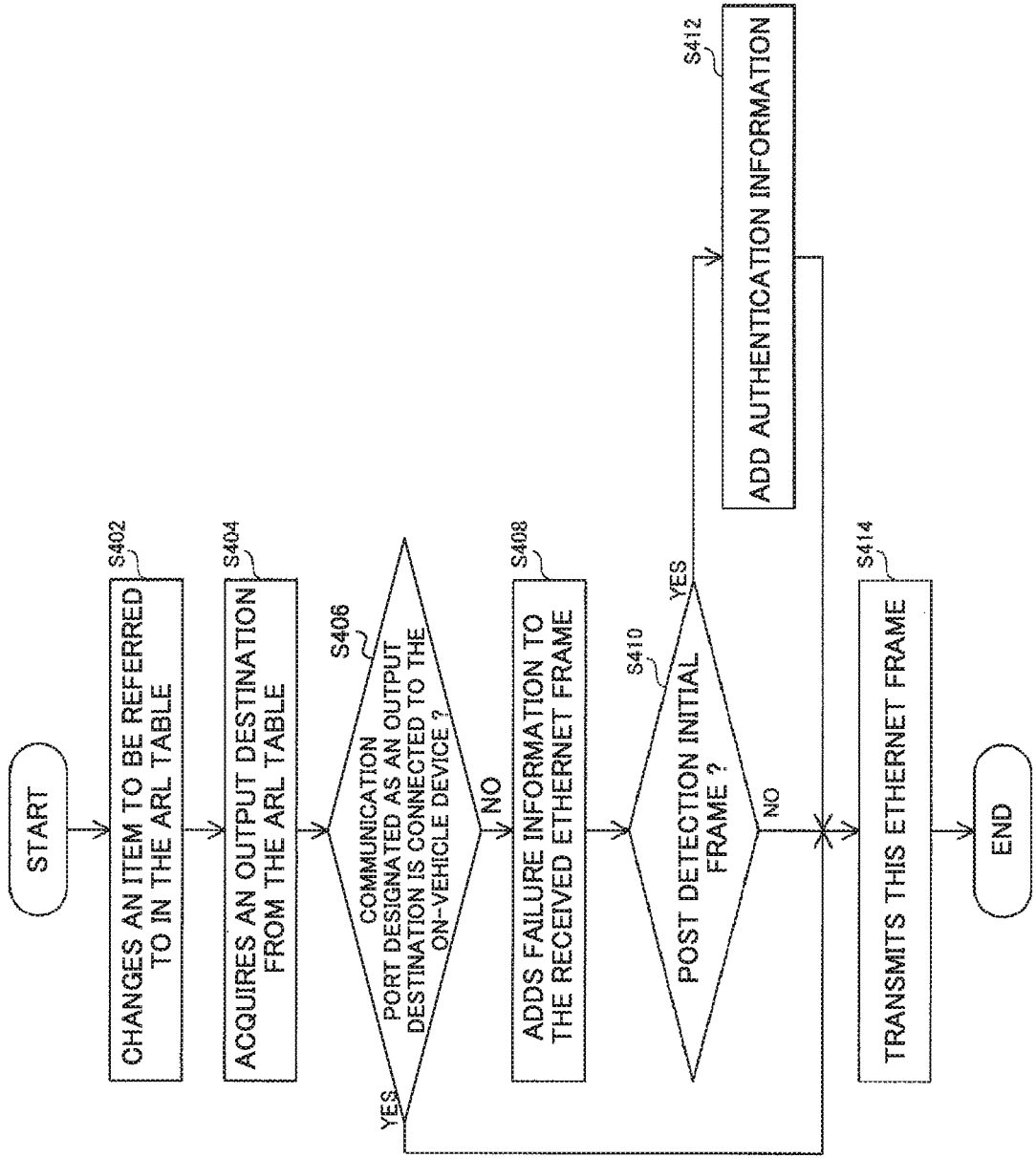
FIG. 15 is a flowchart of an operational procedure performed when the switching device in the on-vehicle communication system according to an embodiment of the present disclosure performs first failure-occurrence-time processing.

FIG. 15 is a flowchart of an operational procedure performed when the switching device in the on-vehicle communication system according to an embodiment of the present disclosure performs the first failure-occurrence-time processing. FIG. 15 illustrates the details of the operation at step S312 in FIG. 14.

Referring to FIG. 15, the switching device 101 first changes an item to be referred to in the ARL table from "normal" to the item corresponding to the site where the failure occurs based on the failure information in the received Ethernet frame (step S402).

Next, the switching device 101 confirms the destination MAC address in the received Ethernet frame and acquires an output destination corresponding to the confirmed destination MAC address in the changed item from the ARL table stored in the storage unit 23 of its own (step S404).

Then, if the acquired communication port 54 for the output destination is connected to another switching device 101 (NO at step S406), the switching device 101 adds failure information to the received Ethernet frame (step S408).

Subsequently, if the received Ethernet frame is the first Ethernet frame to be transmitted to the target switching device after the change of the destination to be referred to in the ARL table, i.e., the post detection initial frame (YES at step S410), the switching device 101 adds authentication information to the received Ethernet frame (step S412).

Next, the switching device 101 performs the following processing if the acquired communication port 54 designated as an output destination is connected to the on-vehicle device 111 (YES at step S406), if the received Ethernet frame is a non-post detection initial frame (NO at step S410) or if authentication information is added to the Ethernet frame (step S412).

That is, the switching device 101 rewrites the source MAC address of the received Ethernet frame into its own MAC address and transmits this Ethernet frame from the acquired output destination (step S414).

Figure 16:
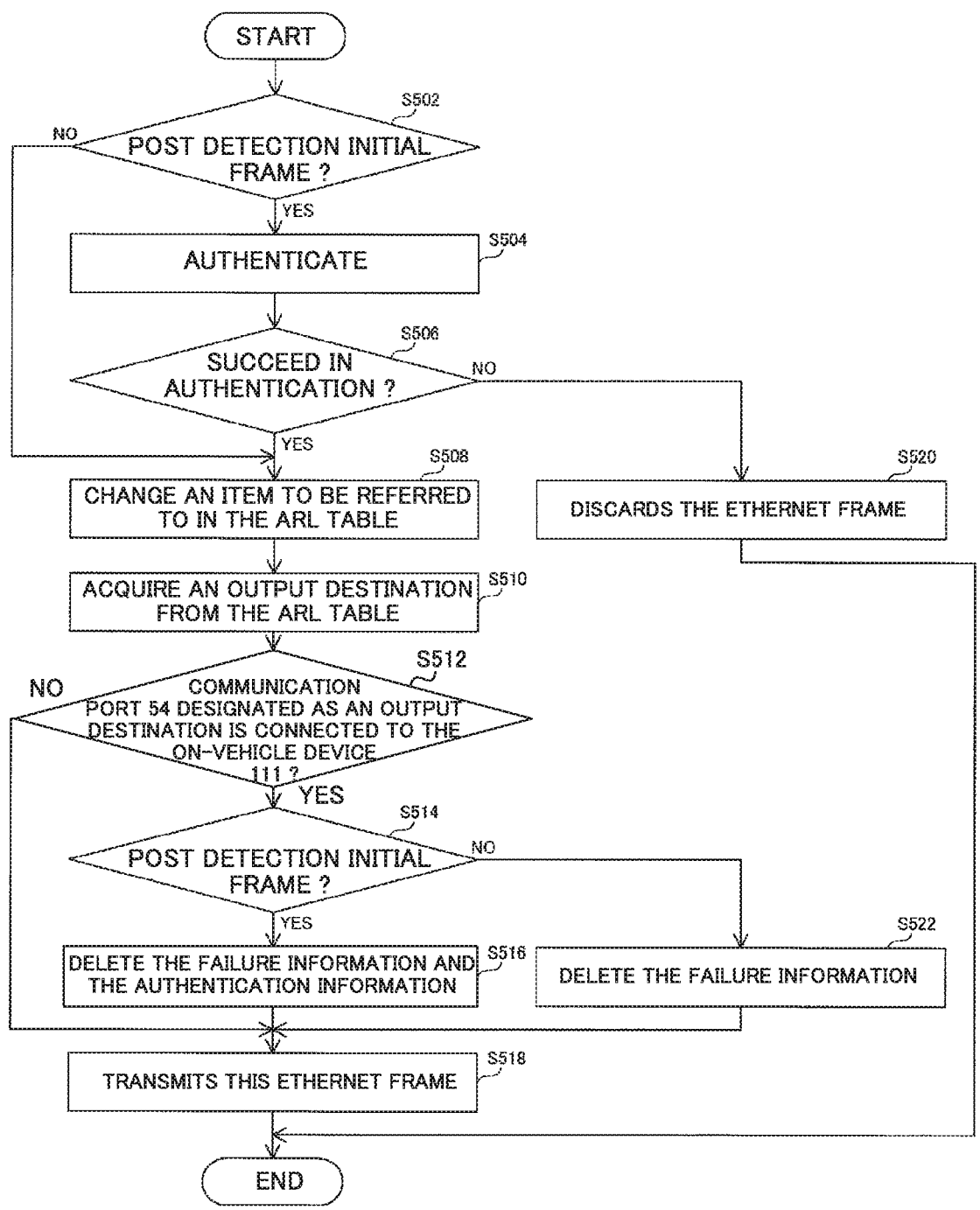
FIG. 16 is a flowchart of an operational procedure performed when the switching device in the on-vehicle communication system according to an embodiment of the present disclosure performs second failure-occurrence-time processing.

FIG. 16 is a flowchart of an operational procedure performed when the switching device in the on-vehicle communication system according to an embodiment of the present disclosure performs the second failure-occurrence-time processing. FIG. 16 illustrates the details of the operation at step S310 in FIG. 14.

Referring to FIG. 16, if the received Ethernet frame is a post detection initial frame (YES at step S502), the switching device 101 first authenticates the Ethernet frame based on the authentication information of the received Ethernet frame (step S504).

Next, if failing in authentication (NO at step S506), the switching device 101 discards the received Ethernet frame and ends the second failure-occurrence-time processing.

Then, if the received Ethernet frame is a post detection non-initial frame (NO at step S502), or if the switching device 101 succeeds in authentication (YES at step S506), the switching device 101 changes an item to be referred to in the ARL table from "normal" to the item corresponding to the site where the failure occurs based on the failure information in the received Ethernet frame (step S508).

Subsequently, the switching device 101 confirms the destination MAC address in the received Ethernet frame and acquires an output destination corresponding to the confirmed destination MAC address in the changed item from the ARL table stored in the storage unit 23 of its own (step S510).

Then, if the acquired communication port 54 designated as an output destination is connected to the on-vehicle device 111 and the received Ethernet frame is the post detection initial frame (YES at step S512 and YES at step S514), the switching device 101 deletes the failure information and the authentication information from the received Ethernet frame (step S516).

If, on the other hand, the acquired communication port 54 designated as an output destination is connected to the on-vehicle device 111 and the received Ethernet frame is a post detection non-initial frame (YES at step S512 and NO at step S514), the switching device 101 deletes the failure information from the received Ethernet frame (step S522).

Subsequently, if the acquired communication port 54 designated as an output destination is connected to another switching device 101 (NO at step S512), if the switching device 101 deletes the failure information and the authentication information from the received Ethernet frame (step S516), or if the switching device 101 deletes the failure information from the received Ethernet frame (step S522), the switching device 101 performs the following processing.

That is, the switching device 101 rewrites the source MAC address in the received Ethernet frame into its own MAC address and then transmits this Ethernet frame from the acquired output destination (step S518).

It is noted that in the switching device according to an embodiment of the present disclosure, the switching unit 24 is configured to transmit to the target device failure information indicating the site where a communication failure occurs, though the configuration is not limited thereto. The switching unit 24 may be configured to transmit failure information indicating a communication port 54 to be used by the target switching device when a communication failure occurs to this target switching device.

Specifically, in the on-vehicle communication system 301, a storage device storing the ARL tables TabA-TabD respectively illustrated in FIGS. 8-11 is provided. Meanwhile, the switching devices 101A-101D do not respectively hold the ARL tables TabA-TabD.

If no communication failure occurs in the on-vehicle network 12, the switching devices 101A-101D acquire and use information about the communication port 54 under "normal" from the ARL tables TabA-TabD stored in the storage device, respectively.

For example, when the switching device 101A detects a communication failure in the communication route DA, the switching device 101A acquires information about the communication port 54 under "failure in the route DA" (hereinafter also referred to as failure-occurrence-time-port information) from the ARL tables TabA-TabD stored in the storage device.

The switching device 101A uses the failure-occurrence-time-port information acquired from the ARL table TabA and transmits failure-occurrence-time-port information obtained from the ARL tables TabB-TabD to the respective switching devices 101B-101D as failure information.

Alternatively, in the on-vehicle communication system 301, the storage device configured to collectively hold the ARL tables TabA-TabD is provided, though the configuration is not limited thereto. The switching device 101 may be configured to hold all the ARL tables TabA-TabD.

Furthermore, the switching unit 24 may be configured to transmit to a target switching device failure information indicating both of the site where a communication failure occurs and a communication port 54 to be used by the target switching device when a communication failure occurs.

Moreover, in the switching device according to an embodiment of the present disclosure, the ARL table is configured to show a correspondence among a destination MAC address, a normal-time port and four failure-occurrence-time ports, though the configuration is not limited thereto. The ARL table may be configured to show a correspondence among a destination MAC address, a normal-time port and two, three, or five or more failure-occurrence time ports.

Additionally, in the switching device according to an embodiment of the present disclosure, the ARL table is configured to specify the site where a communication failure occurs by a communication route, though the configuration is not limited thereto. The site where a communication failure occurs may be specified by the identifier of the switching device 101 and the identifier of the communication port 54. More specifically, the communication route AB is specified by the identifier of the switching device 101A and the identifier of the communication port 54B of the switching device 101A, for example.

In addition, in the on-vehicle communication system according to an embodiment of the present disclosure, data and failure information are stored in the same Ethernet frame and conveyed, though the configuration is not limited thereto. Data and failure information may be stored in separate Ethernet frames and conveyed.

Furthermore, in the on-vehicle communication system according to an embodiment of the present disclosure, failure information may be stored, not limited to, in the VLAN tagged area or the type area. The failure information may be stored in the payload of the IP packet, which is an IP checksum calculation targeted area, for example.

Moreover, in the on-vehicle communication system according to an embodiment of the present disclosure, the switching unit 24 is configured to include a time stamp in the post detection initial frame after a communication failure is detected, though the configuration is not limited thereto. The switching unit 24 may be configured to include no time stamp in the post detection initial frame even if communication security is ensured, for example.

Additionally, in the on-vehicle communication system according to an embodiment of the present disclosure, the failure information indicates, though not limited to, a site where a communication failure occurs. The failure information may indicate occurrence of a communication failure, for example.

More specifically, in the case where three switching devices 101 are provided in the on-vehicle communication system 301, the usage port information indicates a normal-time port and a failure-occurrence-time port to be used when a communication failure occurs, for example. By such a configuration, the failure-occurrence-time port can correctly be decided based on the presence or absence of a communication failure.

In addition, the switching device according to an embodiment of the present disclosure is configured to delete the VLAN tagged area including the failure information from the tagged frame to thereby convert it to a basic frame and then transmits the basic frame to the on-vehicle device 111 if transmitting an Ethernet frame to the on-vehicle device 111 designated as a destination, though the configuration is not limited thereto. The switching device 101 may be configured to transmit the tagged frame including the failure information as it is to the on-vehicle device 111 designated as a destination.

Furthermore, the switching device according to an embodiment of the present disclosure is configured to have the filter unit 32, though the configuration is not limited thereto. The switching device 101 may be configured to have no filter unit 32 in the case where communication security is ensured, for example.

Meanwhile, applying the redundant configuration described in Patent Document 1 to an on-vehicle network is conceivable, for example. Due to limitation of space in a vehicle, however, a noise source such as an engine, a motor and so on may be arranged close to signal lines. Such an arrangement may sharply deteriorate a communication environment depending on the operation of the noise source. Furthermore, the signal line may be unexpectedly disconnected.

In this case, communication may be made difficult, which is not preferable. Thus, a technique is required that is capable of making redundant switching much faster in the on-vehicle network.

In contrast thereto, the switching device according to an embodiment of the present disclosure relays data in the on-vehicle network 12 and has a plurality of communication ports 54. The detection unit 21 detects a failure in communication with another switching device 101 connected to one of the communication ports 54. The switching unit 24 transmits, to the target switching device, failure information indicating any one of a site where the failure in communication occurs and a communication port 54 to be used when the failure in communication occurs by a target switching device being a switching device 101 different from this another switching 101 device, if a failure in communication is detected by the detection unit 21.

Accordingly, failure information is transmitted to the target switching device when a failure in communication is detected, whereby the target switching device that receives the failure information can recognize that a communication failure occurs between the switching device 101 from which the failure information is transmitted and another switching device 101 based on the failure information, and can confirm the communication port to be used when the communication failure occurs based on the failure information. Thus, the communication route can be switched without sending and receiving information from and to the switching device 101 from which the failure information is transmitted. Hence, redundant switching in the on-vehicle network can be made much faster.

Furthermore, in the switching device according to an embodiment of the present disclosure, the switching unit 24 transmits to the target switching device the data to be transmitted to the target switching device, the data including the failure information.

This makes it possible to reduce the number of transmissions of information in comparison with a case where the data to be transmitted to the target switching device and the failure information are separately transmitted to the target switching device. Thus, redundant switching can be made much faster without reducing transmission efficiency in the on-vehicle network 12.

Moreover, in the switching device according to an embodiment of the present disclosure, the switching unit 24 transmits the data including the failure information in an area other than a checksum calculation targeted area in an IP packet.

This enables transmission of the failure information to the target switching device while recalculation of a checksum is avoided. Thus, redundant switching can be made much faster while preventing increase in processing load in the switching device 101.

Additionally, in the switching device according to an embodiment of the present disclosure, the switching unit 24, when a first frame to be transmitted to the target switching device after detection of the failure in communication is transmitted together with the failure information included in the first frame, includes authentication information in the first frame.

This allows the target switching device to confirm that this Ethernet frame is an authenticated frame based on the authentication information included in the received frame. Thus, redundant switching can be made much faster while ensuring security.

In addition, in the switching device according to an embodiment of the present disclosure, a storage unit 23 stores usage port information indicating a correspondence among destination address information, the communication port 54 to be used at a normal time and a failure-occurrence-time port being at least one of the communication ports 54 to be used when a failure in communication occurs. The switching unit 24 decides one of the communication ports 54 of the switching device of itself 101 to be used for transmission of the data based on the destination address information included in the data and the usage port information if the data including failure information indicating a failure in communication between other switching devices 101 is received by the switching device of itself 101.

Accordingly, the communication port 54 to which connection is switched is decided based on the destination address information and the usage port information, whereby the data can be quickly transmitted from the decided port. Thus, the communication route can be switched without sending and receiving information to and from the switching device 101 from which the failure information is transmitted. Thus, redundant switching in the on-vehicle network can be made much faster.

Furthermore, in the switching device according to an embodiment of the present disclosure, the failure information includes a site where the failure in communication occurs.

The usage port information indicates the failure-occurrence-time port for each site where the failure in communication occurs.

This allows the switching device 101 to recognize the site where a communication failure occurs based on the failure information even if the communication failure occurs in any communication route and to promptly acquire the failure-occurrence-time port from the usage port information based on the result of confirmation.

Moreover, in the switching device according to an embodiment of the present disclosure, the switching unit 24 transmits the data excluding the failure information if transmitting the data to the target device connected to one of the communication ports 54 of the switching device 101 of itself without interposing another switching device 101.

This allows the target device to receive data including no failure information regardless of the presence or absence of a communication failure. Thus, the target device can be connected to the on-vehicle network 12 without involving a particular specification change.

Additionally, in the switching device according to an embodiment of the present disclosure, the filter unit 32 discards non-target data satisfying a predetermined condition of the data received by the switching device 101 of itself. The filter unit 32 does not discard the non-target data including the failure information.

Accordingly, even if the communication route after redundant switching is a communication route not to be used in the situation where no communication failure occurs, for example, and the filter unit 32 is set to discard the non-target data to be conveyed in this communication route, discard of the non-target data including the failure information can be prevented when a communication failure occurs. This makes it possible to prevent inability to perform redundant switching in the on-vehicle network 12 due to the discard of the failure information.

In addition, in the switching device according to an embodiment of the present disclosure, the filter unit 32 holds normal-time discard information indicative of data to be discarded including the non-target data and failure-occurrence-time discard information indicative of data not to be discarded including the non-target data. The filter unit 32 determines whether or not data is to be discarded using the failure-occurrence-time discard information in place of the normal-time discard information after the switching device 101 of itself receives the non-target data including the failure information.

Hence, the normal-time discard information indicative of data to be discarded is switched to the failure-occurrence-time discard information indicative of data not to be discarded when a communication failure occurs, whereby discard of the non-target data including the failure information can easily be prevented.

It is to be understood that the embodiments disclosed here is illustrative in all respects and not restrictive. The scope of the present disclosure is defined by the appended claims, and all changes that fall within the meanings and the bounds of the claims, or equivalence of such meanings and bounds are intended to be embraced by the claims.

The above description includes features of the clauses described below.

1. A switching device relaying data in an on-vehicle network and having a plurality of communication ports, comprising:

a detection unit that detects a failure in communication with another switching device connected to one of the communication ports; and a processing unit that transmits failure information indicating at least any one of a site where the failure in communication occurs and a communication port to be used when the failure in communication occurs by a target switching device being the switching device to be connected to another one of the communication ports different from the communication port connected to said another switching device if the failure in communication is detected by the detection unit, wherein the switching device relays an Ethernet frame including the data, the communication failure includes a broken link with said another switching device, degradation in communication quality with said another switching device, a fault of the communication port of itself or a fault of said another switching device, and the failure information indicates failure-occurrence-time-port information indicating a communication route where the failure in communication occurs or the communication port to be used when the failure in communication occurs, the communication port corresponding to the site where the failure in communication occurs.

2. A switching device relaying data in an on-vehicle network and having a plurality of communication ports, comprising:

a storage unit that stores usage port information indicating a correspondence among destination address information, the communication port to be used at a normal time and a failure-occurrence-time port being at least one of the communication ports to be used when a failure in communication occurs; and a processing unit that decides one of the communication ports of the switching device of itself to be used for transmission of the data based on the destination address information included in the data and the usage port information if the data including failure information indicating a failure in communication between other switching devices is received by the switching device of itself, wherein the switching device relays an Ethernet frame including the data, the destination address information indicates a destination media access control (MAC) address, and the communication failure includes a broken link with said another switching device, degradation in communication quality with said another switching device, a fault of the communication port of its own or a fault of said another switching device.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A switching device relaying data in an on-vehicle network and having a plurality of communication ports, comprising a hardware processor configured to cause the switching device to perform operations comprising:

detecting a failure in communication with another switching device connected to one of the communication ports;

storing usage port information being a table that indicates:
  a correspondence between a normal time when no communication failure occurs and a normal-time port that is a communication port used in the normal time;
  a correspondence between an occurrence of a communication failure at a first site and a first failure-occurrence-time port that is a communication port used at a time of the communication failure at the first site; and
  a correspondence between an occurrence of a communication failure at a second site and a second failure-occurrence-time port that is a communication port used at a time of the communication failure at the second site, based on the usage port information, deciding the normal-time port as the communication port to be used when no communication failure occurs, deciding the first failure-occurrence-time port as the communication port to be used when the communication failure occurs at the first site, and deciding the second failure-occurrence-time port as the communication port to be used when the communication failure occurs at the second site; and transmitting the data from the normal-time port if the communication failure is not detected, transmitting failure information indicating at least any one of a site where the failure in communication occurs and a communication port to be used when the failure in communication occurs by a target switching device being a switching device different from said another switching device, from the first failure-occurrence-time port to the target switching device if the failure in communication at the first site is detected, and transmitting the failure information from the second failure-occurrence-time port to the target switching device if the failure in communication at the second site is detected.

2. The switching device according to claim 1, wherein the transmitting comprises transmitting to the target switching device the data to be transmitted to the target switching device, the data including the failure information.

3. The switching device according to claim 1, wherein the transmitting comprises transmitting the data including the failure information in an area other than a checksum calculation targeted area in an Internet Protocol packet.

4. The switching device according to claim 1, wherein the transmitting comprises, when a first frame to be transmitted to the target switching device after detection of the failure in communication is transmitted together with the failure information included in the first frame, including authentication information in the first frame.

5. The switching device according to claim 1, wherein the target switching device determines the communication port to be used when the failure in communication occurs, based on at least any one of the site or the communication port to be used indicated by the failure information.

6. A switching device relaying data in an on-vehicle network and having a plurality of communication ports, comprising a hardware processor configured to cause the switching device to perform operations comprising:

storing usage port information indicating a correspondence among destination address information, the communication port to be used at a normal time and a failure-occurrence-time port being at least one of the communication ports to be used when a failure in communication occurs; and deciding one of the communication ports of the switching device itself to be used for transmission of the data based on the destination address information included in the data and the usage port information if the data including failure information indicating a failure in communication between other switching devices is received by the switching device itself, wherein the usage port information is a table that indicates:
  a correspondence between a normal time when no communication failure occurs and a normal-time port that is a communication port used in the normal time;
  a correspondence between an occurrence of a communication failure at a first site and a first failure-occurrence-time port that is a communication port used at a time of the communication failure at the first site; and
  a correspondence between an occurrence of a communication failure at a second site and a second failure-occurrence-time port that is a communication port used at a time of the communication failure at the second site, and the deciding includes, based on the usage port information, deciding the normal-time port as the communication port to be used when no communication failure occurs, deciding the first failure-occurrence-time port as the communication port to be used when the communication failure occurs at the first site, and deciding the second failure-occurrence-time port as the communication port to be used when the communication failure occurs at the second site.

7. The switching device according to claim 6, wherein the failure information includes a site where the failure in communication occurs, and the usage port information indicates the failure-occurrence-time port for each site where the failure in communication occurs.

8. The switching device according to claim 6, wherein the operations further comprise transmitting the data excluding the failure information if transmitting the data to a target device connected to one of the communication ports of the switching device itself without interposing another switching device.

9. The switching device according to claim 6, wherein the operations further comprises discarding non-target data satisfying a predetermined condition out of the data received by the switching device itself, wherein
the non-target data including the failure information is not discarded.

10. The switching device according to claim 9, wherein the operations further comprises:
holding normal-time discard information indicative of data to be discarded including the non-target data and failure-occurrence-time discard information indicative of data not to be discarded including the non-target data, and
determining whether or not data is to be discarded using the failure-occurrence-time discard information in place of the normal-time discard information after the switching device itself receives the non-target data including the failure information.

11. The switching device according to claim 6, wherein the failure-occurrence-time port is defined, in the usage port information, for every site where the failure in communication occurs.

12. A communication control method in a switching device relaying data in an on-vehicle network and having a plurality of communication ports, the switching device storing usage port information being a table that indicates a correspondence between a normal time when no communication failure occurs and a normal-time port that is a communication port used in the normal time, a correspondence between an occurrence of a communication failure at a first site and a first failure-occurrence-time port that is a communication port used at a time of the communication failure at the first site, and a correspondence between an occurrence of a communication failure at a second site and a second failure-occurrence-time port that is a communication port used at a time of the communication failure at the second site, the communication control method comprising:
detecting a failure in communication with another switching device connected to one of the communication ports; and
transmitting failure information indicating at least any one of a site where the failure in communication occurs and a communication port to be used when the failure in communication occurs by a target switching device being a switching device different from said another switching device, to the target switching device if the failure in communication is detected.

13. A communication control method in a switching device relaying data in an on-vehicle network, having a plurality of communication ports, and storing usage port information indicating a correspondence among destination address information, the communication port to be used at a normal time and a failure-occurrence-time port being at least one of the communication ports to be used when a failure in communication occurs, comprising:
receiving the data; and
deciding one of the communication ports of the switching device itself to be used for transmission of the data based on the destination address information included in the data and the usage port information if the data including failure information indicating a failure in communication between other switching devices is received by the switching device itself, wherein
the usage port information is a table that indicates:
a correspondence between a normal time when no communication failure occurs and a normal-time port that is a communication port used in the normal time;
a correspondence between an occurrence of a communication failure at a first site and a first failure-occurrence-time port that is a communication port used at a time of the communication failure at the first site; and
a correspondence between an occurrence of a communication failure at a second site and a second failure-occurrence-time port that is a communication port used at a time of the communication failure at the second site, and
the deciding includes, based on the usage port information, deciding the normal-time port as the communication port to be used when no communication failure occurs, deciding the first failure-occurrence-time port as the communication port to be used when the communication failure occurs at the first site, and deciding the second failure-occurrence-time port as the communication port to be used when the communication failure occurs at the second site.

14. A non-transitory computer readable storage medium storing a communication control program used in a switching device relaying data in an on-vehicle network, having a plurality of communication ports, and storing usage port information being a table that indicates a correspondence between a normal time when no communication failure occurs and a normal-time port that is a communication port used in the normal time, a correspondence between an occurrence of a communication failure at a first site and a first failure-occurrence-time port that is a communication port used at a time of the communication failure at the first site, and a correspondence between an occurrence of a communication failure at a second site and a second failure-occurrence-time port that is a communication port used at a time of the communication failure at the second site, the communication control program causing the switching device to perform operations comprising:
detecting a failure in communication with another switching device connected to one of the communication ports;
based on the usage port information, deciding the normal-time port as the communication port to be used when no communication failure occurs, deciding the first failure-occurrence-time port as the communication port to be used when the communication failure occurs at the first site, and deciding the second failure-occurrence-time port as the communication port to be used when the communication failure occurs at the second site; and
transmitting the data from the normal-time port if the communication failure is not detected, transmitting failure information indicating at least any one of a site where the failure in communication occurs and a communication port to be used when the failure in communication occurs by a target switching device being a switching device different from said another switching device, from the first failure-occurrence-time port to the target switching device if the failure in communication at the first site is detected, and transmitting the failure information from the second failure-occurrence-time port to the target switching device if the failure in communication at the second site is detected.

15. A non-transitory computer readable storage medium storing a communication control program used in a switching device relaying data in an on-vehicle network, having a plurality of communication ports, and storing usage port information indicating a correspondence among destination address information, the communication port to be used at a normal time and a failure-occurrence-time port being at least one of the communication ports to be used when a failure in communication occurs, the communication control program causing the switching device to perform operations comprising:

deciding one of the communication ports of the switching device itself to be used for transmission of the data based on the destination address information included in the data and the usage port information if the data including failure information indicating a failure in communication between other switching devices is received by the switching device itself, wherein the usage port information is a table that indicates:

a correspondence between a normal time when no communication failure occurs and a normal-time port that is a communication port used in the normal time;

a correspondence between an occurrence of a communication failure at a first site and a first failure-occurrence-time port that is a communication port used at a time of the communication failure at the first site; and a correspondence between an occurrence of a communication failure at a second site and a second failure-occurrence-time port that is a communication port used at a time of the communication failure at the second site, and the deciding includes, based on the usage port information, deciding the normal-time port as the communication port to be used when no communication failure occurs, deciding the first failure-occurrence-time port as the communication port to be used when the communication failure occurs at the first site, and deciding the second failure-occurrence-time port as the communication port to be used when the communication failure occurs at the second site.

* * * * *